United States Patent [19]

Pawelski

[11] Patent Number: 4,716,453

[45] Date of Patent: Dec. 29, 1987

[54] DIGITAL VIDEO TRANSMISSION SYSTEM

[75] Inventor: Robert L. Pawelski, Naperville, Ill.

[73] Assignee: AT&T Bell Laboratories, Murray Hill, N.J.

[21] Appl. No.: 746,840

[22] Filed: Jun. 20, 1985

[51] Int. Cl.[4] ............................................. H04N 11/06
[52] U.S. Cl. ..................................... 358/13; 358/133; 358/138; 375/27
[58] Field of Search ................. 358/13, 133, 136, 138; 382/56; 375/27, 122

[56] References Cited

U.S. PATENT DOCUMENTS

| | | | |
|---|---|---|---|
| 3,632,865 | 1/1972 | Haskell et al. | 178/6 |
| 3,778,543 | 12/1973 | Lowry | 178/5.4 R |
| 3,973,199 | 8/1976 | Widmer | 325/38 B |
| 4,023,199 | 5/1977 | Netravali et al. | 358/13 |
| 4,125,856 | 11/1978 | Netravali et al. | 358/13 |
| 4,125,861 | 11/1978 | Mounts et al. | 358/133 |
| 4,141,034 | 2/1979 | Netravali et al. | 358/13 |
| 4,206,447 | 6/1980 | Ching et al. | 340/347 DD |
| 4,217,609 | 8/1980 | Hatori et al. | 358/136 |
| 4,383,272 | 5/1983 | Netravali et al. | 358/136 |
| 4,573,167 | 2/1986 | Hentschke et al. | 375/27 |
| 4,591,909 | 5/1986 | Kuroda | 375/27 |

OTHER PUBLICATIONS

D. Izraelevitz and J. L. Koslov, "Code Utilization for Component-Coded Digital Video", RCA Laboratories, Princeton, N.J., pp. 22-30.

A. N. Netravali and C. B. Rubinstein, "Luminance Adaptive Coding of Chrominance Signals", *IEEE Trans. on Comms.*, vol. COM-27, No. 4, (Apr. 1979), pp. 703-710.

R. Schafer, "DPCM Coding of the Chrominance Signals for the Transmission of Color TV Signals at 34 Mbits/S", *Signal Processing*, vol. 6, No. 3, (Jun. 1984), pp. 187-199.

L. S. Golding and P. M. Schultheiss, "Study of an Adaptive Quantizer", *Proceedings of the IEEE*, vol. 55, No. 3, (Mar. 1967), pp. 293-297.

T. Kummerow, "Statistics for Efficient Linear and Non-Linear Picture Encoding", (Institut fur Nachrichtentechnik, Technische Universitat Braunschweig), pp. 149-161.

(List continued on next page.)

Primary Examiner—Michael A. Masinick
Attorney, Agent, or Firm—David Volejnicek

[57] ABSTRACT

In a high-quality component video digital transmission system (FIGS. 1 and 2), transmitter DPCM encoders (110-112) and corresponding receiver DPCM decoders (210-212) include respective adaptive quantizers (402-502 and 802-902) in which a set of prediction error-representative values is selected by the predicted value of only the one sample currently being encoded or decoded. At each encoder and decoder, the predicted values are quantized by a quantizer selector (406-506 and 807-907) into groups. One group is selected by the predicted value of the current sample. An adaptive quantizer set is then selected by the selected group. The selected set's prediction error-representative values span a range of error values bounded by the maximum and minimum error values possible for any predicted value of the selecting group. Furthermore, the predicted value of each chrominance sample is forced at each chrominance encoder and decoder by a respective limiter (505, 905) to lie within bounds determined by the corresponding luminance sample value (FIGS. 6 and 7). Improvements in image quality thus obtained permit further transmission rate reduction, by using interleaved subsamplers (107-109). At the transmitter, an interpolation selector (113) selects interpolation methods for reconstructing sample values discarded during subsampling on the basis of only luminance signal samples. At the receiver, both luminance and chrominance interpolators (207-209) apply the same method to reconstruct the value of a luminance and a corresponding chrominance discarded sample. These techniques together enable high-quality component video transmissions to proceed over a 45 Mbps link (200).

48 Claims, 9 Drawing Figures

OTHER PUBLICATIONS

A. C. Schroeder, "System for Recovering Color Television Signal Fine Detail Information . . . ", *RCA Technical Notes,* TN No. 1266, (Dec. 19, 1980).

H. G. Musmann, "Predictive Image Coding", *Advances in Electronics and Electron Physics,* Suppl. 12, (1979), pp. 73-112.

A. N. Netravali and J. O. Limb, "Picture Coding: A Review", *Proceedings of the IEEE,* vol. 68, No. 3, (Mar. 1980), pp. 366-406.

G. A. Reitmeier and R. A. Dischert, "A Multiplexed Nyquist Region Approach for High Quality 2:1:1 Digital Video", 13*th Int. TV Symposium, Symposium Record,* (Montreux 28 May-2 Jun. 1983), pp. 400-408.

M. D. Windram and J. S. Lothion, "MAC-Television System for *Satellite Broadcasting*", (*Independent Broadcasting Authority*).

I. G. Brown, "Primary Signal Component Coding", *International Broadcasting Convention,* Conf. Pub. No. 191, (Sep. 20-23, 1980), pp. 344-349.

DIGITAL VIDEO TRANSMISSION SYSTEM

TECHNICAL FIELD

This invention generally concerns apparatus for processing of component high-quality video digital signals at the transmitter and at the receiver of a video transmission system, and particularly concerns a differential pulse code modulation encoder and a decoder for such system.

BACKGROUND OF THE INVENTION

Broadcast color video signals conventionally comprise three component signals: a luminance signal, designated as Y, which carries the image contrast—black and white—information, and two chrominance signals, designated either as I and Q or (R-Y) and (B-Y), which carry the image color information. Composite video, such as the NTSC video signal that is the standard for color television transmissions in North America, combines the three analog component signals for transmission by modulating a carrier with both of the chrominance signals in phase-quadrature and then interleaving the combined chrominance signal with the baseband luminance signal. Component video, however, treats the analog baseband luminance and chrominance signals as separate channels and does not combine them in analog form. Component video produces a higher-quality image than composite video because it avoids crosstalk between the three analog components that would be introduced by combining them as in composite video, and because it can allow for more bandwidth for the chrominance components of the signal than does the NTSC composite video format.

Digital signal transmissions are less susceptible than analog signal transmissions to noise and other image degradations introduced during transmission; hence, the quality of a received video image can be enhanced further by means of digital video signal distribution. The frequency, or bit rate, required for digital transmission of component video is determined by the sampling rate and bits per sample for each of the luminance and chrominance signals. The sampling rate and the number of bits used per sample are generally directly related to the image resolution and quality. Image quality is thus generally directly related to the transmission bit rate, and hence it is desirable to keep the transmission rate at a maximum. However, conventional transmission facilities are generally limited in the transmission rate that they can handle, and the cost of a transmission facility is generally directly related to the maximum rate that it can handle. Hence it is desirable to keep the transmission rate to a minimum.

These conflicting considerations have resulted in numerous techniques and arrangements that have imaginatively sought to reduce the transmission rate of component video signals. An example of such an analog technique is to greatly limit the bandwidth of chrominance signals—to 0.5 MHz, for example—and even of the luminance signals, to reduce the frequency at which the signals need be sampled during digitization. This technique, however, leads to excessive distortion of, and lack of resolution in, the video image. Information on image detail is carried at the higher frequencies. Hence, the lower is the signal bandwidth, the more of the detail is lost from the image.

Another example of an analog technique takes advantage of the periodicity of the video signals' spectrum to reduce the sampling rate, by sampling the video signals at sub-Nyquist frequencies. The Nyquist frequency is twice the maximum frequency contained by the signal and theoretically is the lowest frequency at which a given signal may be sampled such that the samples retain all information content of the sampled signal. The disadvantage of this approach is that sub-Nyquist sampling results in image distortion, due to aliasing, and hence degrades the image quality.

Aside from their idiosyncratic failings, analog rate reduction techniques share certain disadvantages that digital rate reduction techniques do not have. Their major disadvantage is the degradation that they produce in the signal-to-noise ratio, which degradation results in presence of noise and errors in the reproduced image. Another disadvantage common to analog rate reduction techniques is the difficulty of manipulating analog video signals. For example, sharp analog signal filters are both difficult to implement and cause distortions in the video signals. Hence the art has tended to turn to digital techniques when it has sought to reduce video transmission rate without sacrificing greatly video image quality.

Various techniques for image compression are available in the digital domain, that is, once the image has been digitized. One such technique is interleaved subsampling, which discards every sample of one phase (i.e., every other sample) of an image scan line and every sample of the opposite phase of an adjacent scan line, and instead of each discarded sample merely transmits an interpolation code indicating whether values of horizontally adjacent samples (adjacent samples on the same scan line), of vertically adjacent samples (adjacent samples on adjacent scan lines), or of diagonally adjacent samples are to be used at the receiver to interpolate the value of the discarded sample. Another technique, related to interleaved subsampling, takes advantage of the fact that the value of chrominance signals tends to vary directly as the value of luminance signals, and hence transmits merely the luminance interpolation code and uses this code to interpolate both the luminance and the chrominance discarded sample values.

Yet another compression technique is differential pulse code modulation (DPCM), which reduces the number of bits required to transmit the value of a sample by only transmitting information about the difference of a sample from its predicted value. The predicted value is derived from the values of preceding samples. The art has sought to reduce image degradation that results from DPCM by use of adaptive quantization, a technique that uses a plurality of "scales"—quantizers—for measuring differences between samples and their predicted values, and for each sample selects and uses the "scale" thought best for minimizing granularity of information that is most significant to duplicating the appearance of the original sample in the reconstructed sample. Selection of the "scale" is based on a value calculated from predicted values of a plurality of preceding samples. Implementations of this technique have been only marginally successful in achieving their objective, primarily because the values of preceding samples are not necessarily good predictors of the optimum "scale" applicable to a current sample.

Their generally superior performance over analog techniques notwithstanding, the digital compression techniques eliminate or only approximate certain image information, and to that extent they result in image degradation. Therefore, in order to keep image quality high, it has heretofore not been possible to fully exploit the rate reduction capabilities possessed by combinations of these techniques. Hence, the transmission rate for high-quality images has remained undesirably high. What the art requires is further reduction in high-quality image transmission rates without substantial deterioration of the image quality in the process.

SUMMARY OF THE INVENTION

The invention is directed to solving these and other difficulties of the prior art. According to one aspect of the invention, digital encoding and decoding arrangements use values of the luminance signal to impose bounds on values of the chrominance signals. An encoder and a decoder—the one useful in an arrangement for transmitting and the other in an arrangement for receiving, respectively, component video signals in digital form—each comprises an arrangement for determining the upper and the lower bound of a value of a chrominance component video signal on the basis of a value of a corresponding luminance component video signal, an arrangement for predicting a value for the chrominance signal, an arrangement for determining whether the predicted value falls between the bounds, and an arrangement that substitutes the bound that is closest to the predicted value for the predicted value when the predicted value is determined to fall outside of the bounds. A bounded predicted value of the chrominance signal is thus obtained.

An encoder further includes an arrangement that generates a signal representative of the difference between the bounded predicted value and an actual value of the chrominance signal. When the encoder is used in a transmitting arrangement, the difference-representative signal is transmitted across a transmission medium.

The transmitted signal is received across the medium by a receiving arrangement. A decoder of the receiving arrangement includes an arrangement that generates a reconstructed value of the chrominance signal by modifying the bounded predicted value with a difference value obtained from the difference-representative signal.

When used in a DPCM video transmission system, the above-described encoder and decoder double the color resolution of the transmitted reconstructed image, as compared with that obtained with conventional DPCM encoding and decoding schemes at any given transmission rate. Hence at any given transmission rate, quality of the transmitted image is significantly enhanced. Alternatively, the rate of transmission may be lowered beyond that possible with conventional DPCM encoding and decoding techniques without decreasing image quality below acceptable levels. Hence, with use of the above-described encoder and decoder, a plurality of transmission rate-reduction techniques may be used together to lower the overall video transmission rate beyond that heretofore possible while maintaining the image quality required for high-quality video.

Accordingly, a high-quality component video digital transmission system according to this invention combines the technique of luminance bounding of the chrominance signals with such techniques as interleaved subsampling, luminance prediction of chrominance, and adaptive quantization, to achieve a transmission rate of 45 Mbps or less. Such a low transmission rate is very advantageous in that it allows the high-quality video transmission system to use a conventional telephony T3 carrier as the transmission medium.

According to another aspect of the invention, an adaptive quantization technique bases selection of one of a plurality of "scales" for measuring the difference between a sample and its predicted value on the predicted value of only the current sample, as opposed to on the basis of predicted values of preceding samples. An encoder, for use in an arrangement for transmitting component video signals in digital form, comprises a plurality of sets—the "scales"—of representative values of quantization levels of first (i.e., luminance or one of the chrominance) component video signal prediction errors, an arrangement for selecting a set of the error-representative values on the basis of only a current predicted value of the first signal, an arrangement for selecting an error-representative value from the selected set on the basis of the difference between the predicted value and an actual value of the first signal, and an arrangement for generating a signal indicative of the selected error-representative value. In a transmitting arrangement, the indicative signal is transmitted across a medium.

The transmitted signal is received in an arrangement for receiving component video signals in digital form. A decoder for use in the receiving arrangement comprises a plurality of sets of representative values of quantization levels of first component video signal prediction errors, an arrangement for selecting a set of the representative values on the basis of only a current predicted value of the first signal, an arrangement for selecting an error-representative value from the selected set on the basis of the received indicative signal, and an arrangement for generating a reconstructed value of the first signal by modifying the predicted value with the selected error-representative value.

When used in a DPCM video transmission system, the above-described encoder and decoder optimize selection of a set of quantization level error-representative values. Their use results in the selection of a set that represents the preferred quantization levels, i.e., levels that minimize granularity (i.e., maximize resolution) of information that is most significant to duplicating the appearance of the original sample in the reconstructed sample. Hence at any given transmission rate, quality of the transmitted image is enhanced. Alternatively, the rate of transmission may be lowered beyond that possible with conventional adaptive quantization techniques without decreasing image quality below acceptable levels. As in the case of the first aspect of the invention, therefore, use of the above-described coder and decoder allows a plurality of transmission rate-reduction techniques to be used together to lower the overall video transmission rate beyond that heretofore possible while maintaining the image quality required for high-quality video.

Preferably, the arrangement for selecting a set of the error-representative values comprises a plurality of quantization groups of predicted values of the first signal, an arrangement for selecting a quantization group on the basis of the predicted value of the first signal, and an arrangement for selecting a set of representative values on the basis of the selected quantization group. Quantizing the predicted values into groups in this manner not only avoids having a separate set of quantization level error-representative values for each predicted value, and hence reduces drastically the number of representative value sets without increasing greatly the coarseness of the levels that the values represent; it also permits quantization of different predicted values into groups of different sizes, so as to again minimize granularity of information that is most significant to duplicating the appearance of the original sample in the reconstructed sample. The quality of the reconstructed image is thereby optimized.

Also preferably, the plurality of sets of representative values comprise a plurality of sets of representative values each associated with at least one predicted value, wherein the error-representative values of each set represent quantization levels that together span a range of first signal prediction error values bounded by an error value that is the maximum allowed for any one of the at least one predicted values and an error value that is the minimum allowed for any one of the at least one predicted values. Imposing such bounds on the range of error values of each group of at least one predicted value limits the span of each group's range to about one-half of the total range of error values in which are included the error values of any possible predicted value. The granularity of the quantization levels represented by the error-representative values of each set is thereby approximately halved, and hence the resolution of the transmitted reconstructed image is approximately doubled. The advantages of increasing image resolution were enumerated above.

In an illustrative embodiment of a high-quality component video digital transmission system, DPCM encoders at the transmitter and corresponding DPCM decoders at the receiver include respective adaptive quantizers in which selection of a set of prediction error-representative values, each representing a quantization level of sample value prediction errors, is done on the basis of the predicted value of only the one sample currently being encoded or decoded. At each encoder and decoder, the predicted values are quantized by a quantizer selector into groups. One group is then selected on the basis of the predicted value of only the current sample. An adaptive quantizer set is then selected on the basis of the selected group. The selected set's prediction error-representative values represent quantization levels that span a range of error values which is bounded by the maximum and minimum error values possible for any predicted value of the selecting group. Furthermore, the predicted value of each chrominance sample is forced at each chrominance encoder and decoder by a limiter to lie within bounds determined by the corresponding luminance sample value. The combined use of these techniques yields improvements in image quality that permit further transmission rate reduction by use of interleaved subsamplers that apply interleaved subsampling to both luminance and chrominance signal samples. At the transmitter, an interpolation selector selects interpolation methods for reconstructing sample values discarded during subsampling on the basis of only the luminance signal samples. At the receiver, the selected method is applied by both luminance and chrominance interpolators to reconstruct the values of both a luminance and the corresponding chrominance discarded sample. Combined use of these techniques enables high-quality component video transmissions to proceed over a 45 megabit per second link.

These and other advantages and features of the present invention will become apparent from the following description of an illustrative embodiment of the invention, taken together with the drawing.

DETAILED DESCRIPTION

Figure 1:
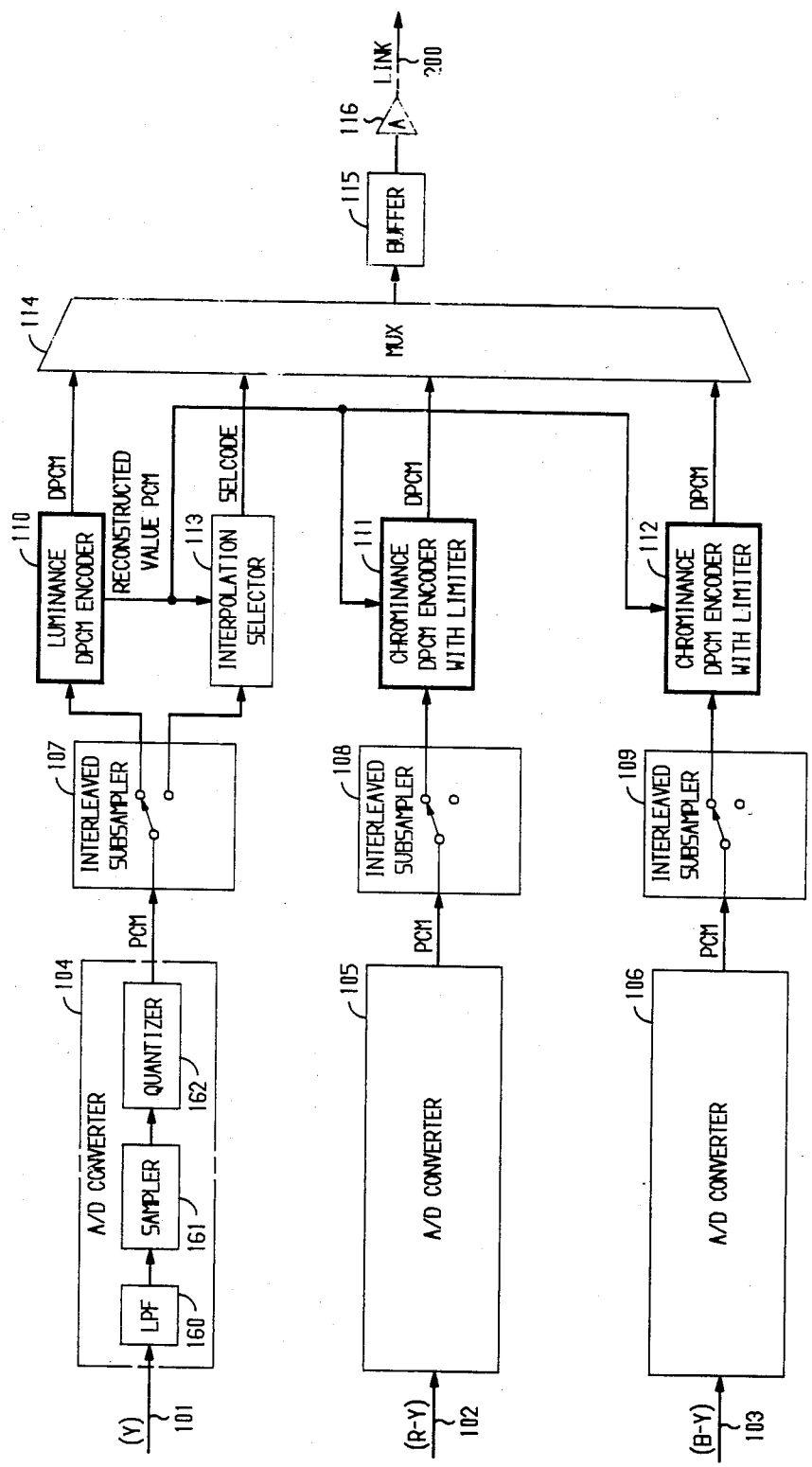
FIG. 1 is a block diagram of the transmitter portion of an exemplary digital component video transmission system that embodies an illustrative example of the invention.
Figure 2:
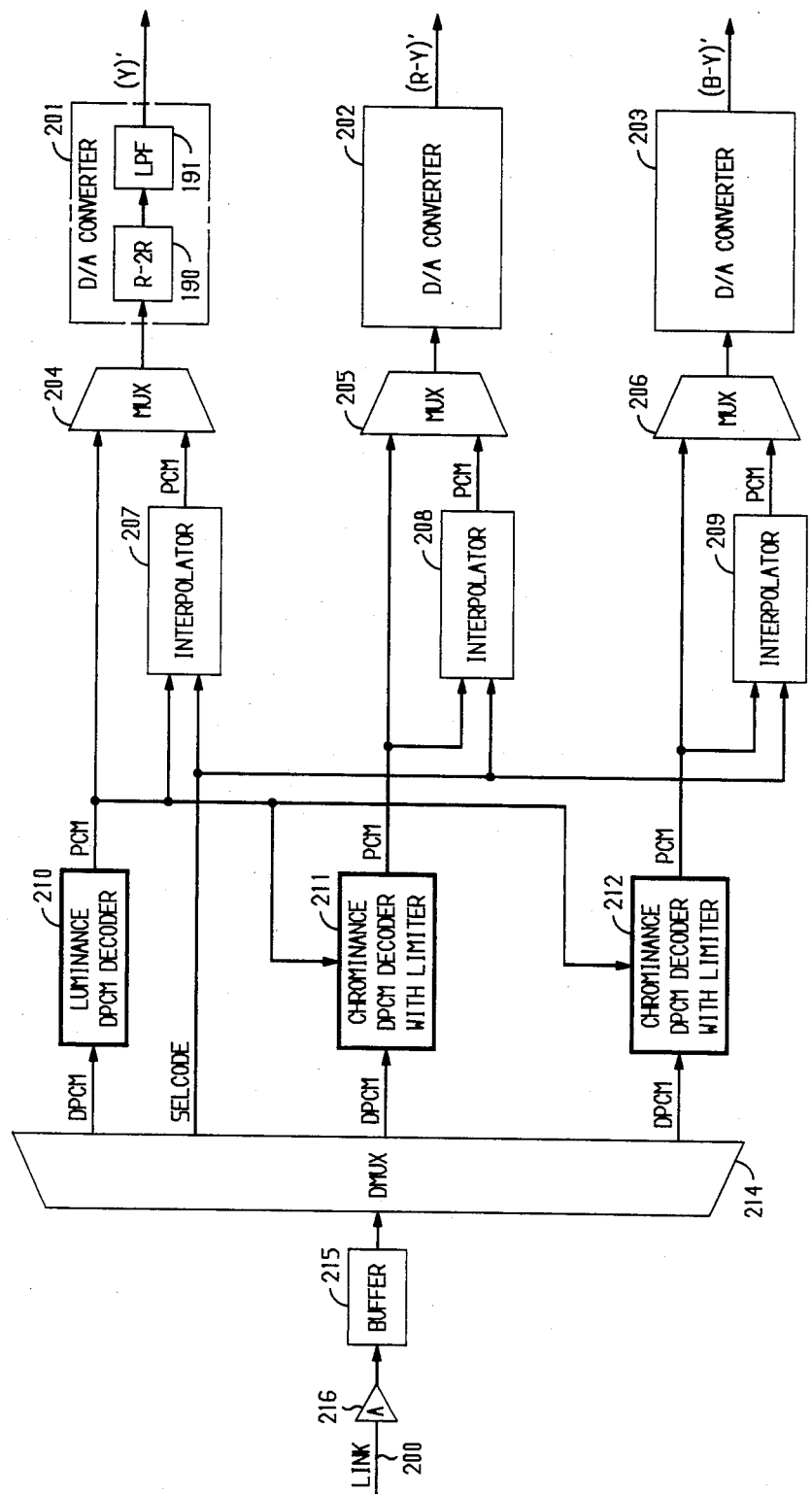
FIG. 2 is a block diagram of the receiver portion of the transmission system.

FIGS. 1 and 2 together show a system for communicating component high-quality video signals in digital form. FIG. 1 illustrates the transmitter portion of the system while FIG. 2 illustrates the receiver portion. While only one receiver portion is shown, the system may include a plurality of receiver portions.

Referring to FIG. 1, at the transmitter portion each analog component video signal is converted by sampling from analog to digital form, is subsampled in an interleaved manner, and then is DPCM-encoded. The subsampled luminance signal is further used to generate an interpolation code for use in reconstructing both the luminance and corresponding chrominance signals discarded during subsampling. The subsampled luminance signal is also used to limit corresponding chrominance signal predicted values that are generated as part of the DPCM encoding of the chrominance subsamples. The chrominance and luminance DPCM codes and the interpolation code are then multiplexed and transmitted onto a transmission link leading to the receiver portion.

Analog component video signals are conventionally generated by horizontally scanning an image line by line, from top to bottom. The signals are received at the transmitter portion in Y, (R-Y), and (B-Y) analog component form, over leads 101, 102, and 103, respectively, and are fed to the input ports of analog-to-digital (A/D) converters 104, 105, and 106, respectively. The A/D converters 104–106 are conventional devices. Each comprises a low-pass filter 160 for bandlimiting the video signal, a sampler 161 for sampling the bandlimited signals, and a quantizer 162 for rounding off each sample to the nearest digital level. For purposes of compatibility with the emerging 4:2:2 components standard, preferably the luminance signal (Y) is bandlimited to a 4.2 MHz bandwidth, the chrominance signals (R-Y) and (B-Y) are bandlimited to 2.1 MHz bandwidths, and the bandlimited luminance signal is preferably sampled at a predetermined frequency that is twice the sampling frequency of the chrominance signals. The bandlimited signals are preferably sampled at super-Nyquist rates. For example, the luminance signal may be sampled at 10.35 MHz and the chrominance signals may be sampled at 5.18 MHz. The output of the quantizer for each luminance sample is preferably a conventional 8-bit unsigned pulse-code-modulated (PCM) digital signal Y, and the output of a quantizer for each chrominance sample is a conventional 9-bit signed PCM digital signal. The output of each A/D converter 104–106 is thus a digital signal stream of the actual values of adjacent samples of a scan line of the image.

Figure 3:
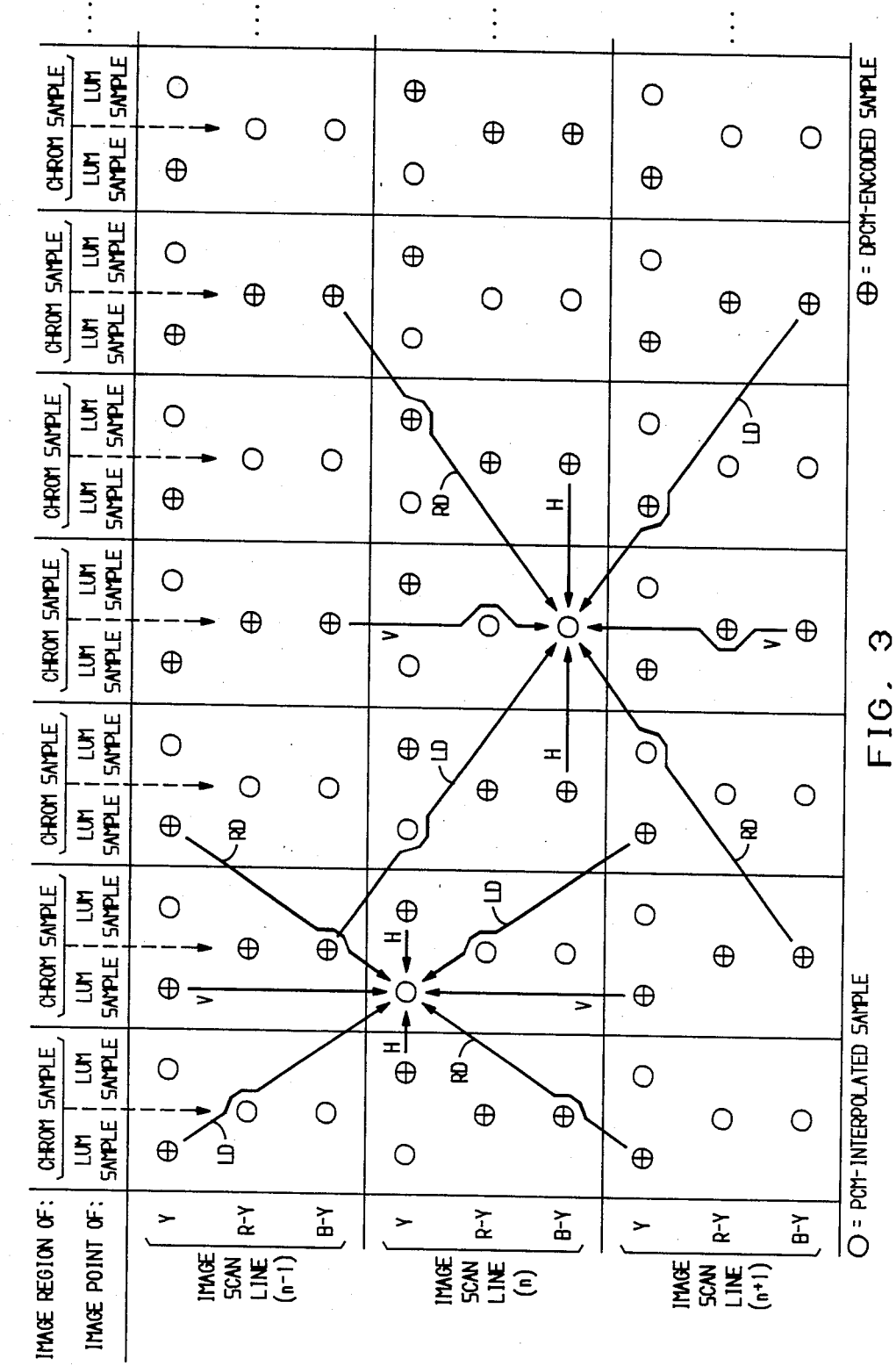
FIG. 3 is a spatial representation of the operation of the samplers, the subsamplers, and the interpolation selector of FIG. 1.

From the A/D converters 104–106, the PCM signal streams are coupled to inputs of interleaved subsamplers 107–109, respectively. Each interleaved subsampler 107–109 is essentially a switch having one input and two outputs. The switch channels the values of adjacent samples that it receives at its input to different ones of its two outputs. Thus, the actual value of every sample of one phase (i.e., of every other sample) of an image scan line is switched to one output, while the actual value of every sample of the second phase of that scan line is switched to the other output. The number of samples of every scan line is even but reversed in phase for every successive scan line; hence the switch switches the value of every sample of the second phase of the next image scan line to the one output and switches the value of every sample of the one phase of that scan line to the other output. Thus, one half of the sample values are switched to one output while the other half of the sample values are switched to the other output, and the value of a sample is switched to one output while the values of samples vertically and horizontally adjacent thereto are switched to the other output—a process known as interleaved subsampling. These relationships are illustrated in FIG. 3.

The values of samples from one output of the interleaved subsampler 109 are input to a DPCM encoder with limiter 112. The values of samples from the other output of the interleaved subsampler 109 are discarded. Hence, only values of alternate adjacent samples are channeled to the encoder with limiter 112.

The values of those samples which represent the same points in the image as the samples whose values were discarded at the subsampler 109 are also discarded at the subsampler 108. And the sample values from the other output of the subsampler 108 are input to a DPCM encoder with limiter 111. Hence again, only values of alternate adjacent samples are channelled to the encoder with limiter 111.

Because the luminance signal was sampled at twice the frequency of the chrominance signals, each chrominance sample has two corresponding luminance samples, that is, luminance samples that represent the same image region as the chrominance sample. The luminance sample values channeled to one output of the subsampler 107 are of luminance samples that represent the same image points as all the chrominance samples whose values are incoming to the subsamplers 108 and 109, while the luminance sample values channeled to the other output of the subsampler 107 are of luminance samples of image points that are not represented among the chrominance samples. The sample values from the one output of the subsampler 107 are input to a DPCM encoder 110, while the sample values from the other output of the subsampler 107 are input to an interpolation selector 113. Thus, the luminance samples that represent the same image points as the chrominance samples that are DPCM encoded, are not DPCM encoded, but rather become represented by an interpolation selector coder (SELCODE), as described further below. This relationship is also illustrated in FIG. 3.

The DPCM encoders 110–112 generate a representation of each incoming sample actual value in terms of its difference from a predicted value. In particular, for each incoming sample actual value, a DPCM encoder generates a sample predicted value from the values of preceding sample values, compares the predicted value with the incoming actual value, and generates a code that represents the difference between the compared values. The configuration of the luminance DPCM encoder 110 is shown in FIG. 4, while the configuration of the chrominance DPCM encoders with limiter 111 and 112 is shown in FIG. 5.

Figure 4:
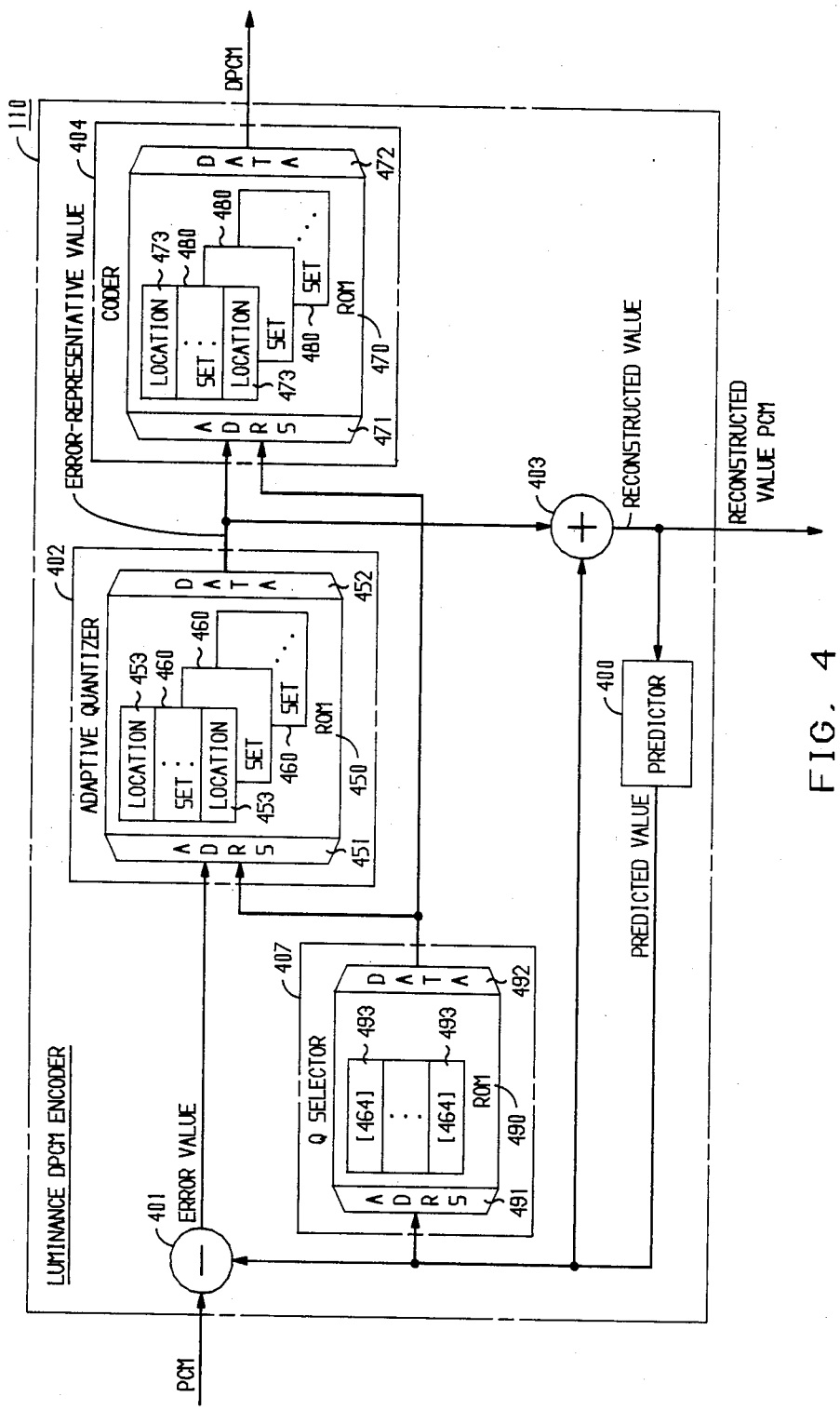
FIG. 4 is a block diagram of the luminance DPCM encoder of FIG. 1.
Figure 5:
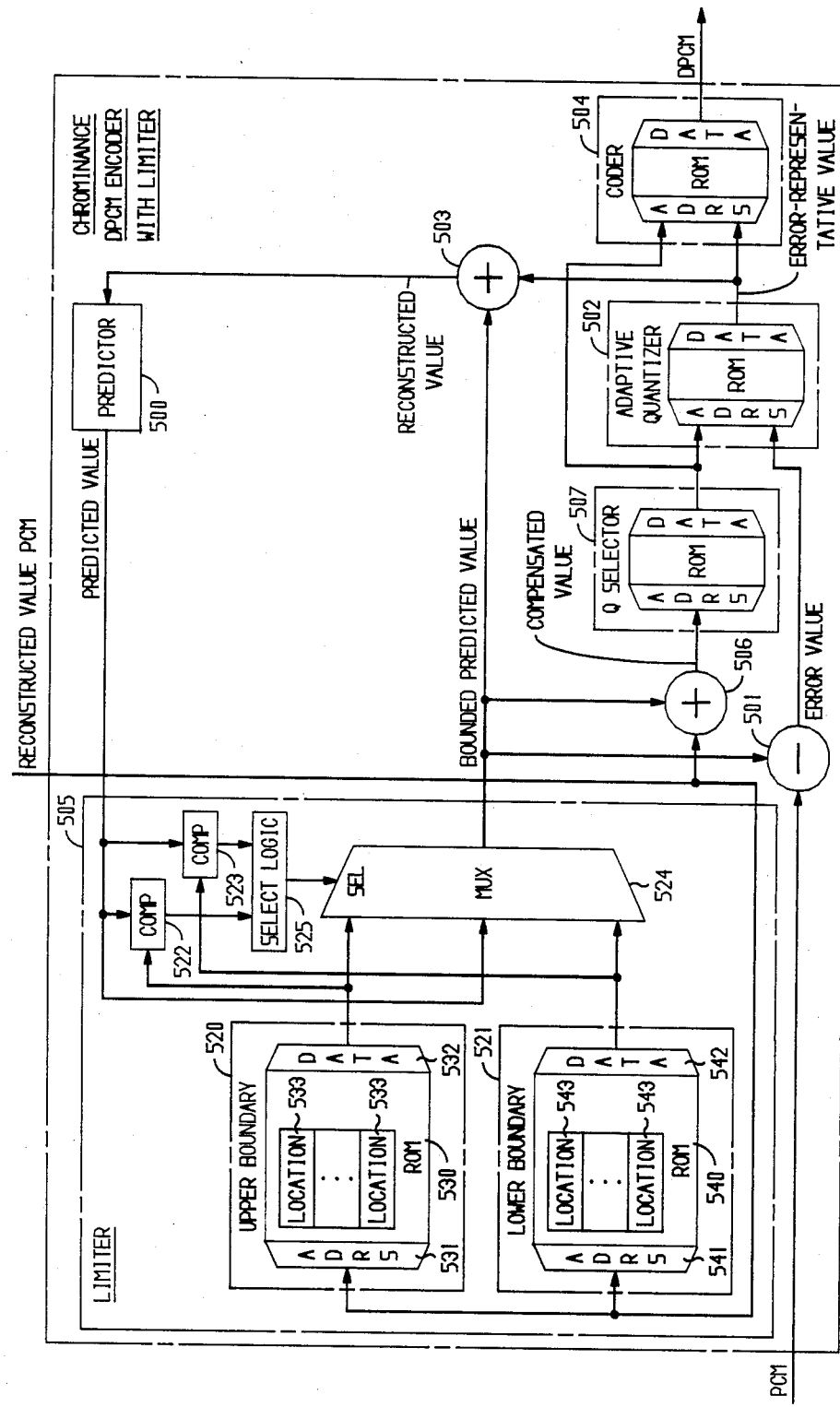
FIG. 5 is a block diagram of a chrominance DPCM encoder with limiter of FIG. 1.

Turning to FIG. 4, the luminance DPCM encoder 110 includes a conventional predictor 400 that predicts a value for a luminance sample from the reconstructed values of preceding luminance samples. The predictor 400 commonly comprises a plurality of registers each for storing the reconstructed value of a preceding luminance sample and a logic circuit for combining the stored values to generate the predicted value for a current luminance sample.

The predicted value output by the predictor 400 is input to a difference circuit 401, to a quantizer selector (Q SELECTOR) 407, and to a sum circuit 403.

At the difference circuit 401, the predicted value is subtracted from the actual value of the luminance sample that is received from the interleaved subsampler 107 (see FIG. 1). The result represents the difference between the actual and the predicted value of the luminance sample and hence indicates the error in the predicted value. The error value is input to an adaptive quantizer 402.

The purpose of the adaptive quantizer 402 is to "round off" the error signal to the nearest discrete error-representative value. The functionality of the adaptive quantizer 402 is based upon the relationships that exist between the predicted and actual sample values, as described below.

The actual value of a luminance sample is represented by an 8-bit PCM digital signal. Thus the actual value of the sample may be represented as any one of 256 values, from 0 to 255. In the worst case, the predicted value may be the exact opposite of the actual value; i.e., when the actual value is 255, the predicted value in the worst case is 0, and when the actual value is 0, the predicted value in the worst case is 255. Hence the error value, representing the difference between the actual and the predicted value, has a total possible range of 511 values, from −255 to +255. Assuming that this range is spanned by, i.e., divided into, 16 quantization levels, each characterized by its own error-representative value such as the level midpoint value, the quantization is quite coarse, since 511 values must be rounded off to only 16 error-representative values.

However, applicant has taken note of the fact that the actual range of error values allowed for any given predicted sample value is only half of the total possible range of 511 values, or 256 values. This is because the sum of the predicted value—which must lie within the range 0–255 of the possible actual sample values—and of the error value must fall within the range of 0 to 255 of the possible actual sample values. For example, when the actual sample value is 0, the error value may only have a value within the range 0 to 255; when the actual sample value is 127, the maximum error value allowed is +128 while the minimum error value allowed is −127, establishing a range from −127 to +128; and when the actual sample value is 255, the error value may only have a value within the range −255 to 0. Thus, if the actual range of error values permissible for each predicted sample value is spanned by 16 quantization levels, the width of each quantization level, and hence coarseness of the quantization represented by that level's error-representative value, is reduced in half from the example given above. Alas, a different set of quantization levels must be used for each actual or predicted sample value.

However, applicant has further recognized that the sets of quantization levels may also be quantized, thereby drastically reducing the number of quantization level sets without increasing greatly the coarseness of the levels. Thus, for example, the predicted sample values may be quantized into 16 groups, and all of the predicted values of one group may have one set of quantization levels associated therewith. As each group has its own set of quantization levels, there are a total of only 16 sets. The resulting quantization groups, quantization levels, and error-representative values of those levels, may then be those shown in Table 1.

greater granularity has been given to quantization levels that bring the reconstructed image value progressively nearer the saturation levels.

To take advantage of the same characteristic of the eye, the predicted value quantization groups are likewise not made all of the same size. Rather, progressively greater granularity is given to quantization groups that include predicted values which are progressively nearer the saturation values.

Returning to FIG. 4, the task of assigning quantization groups to predicted values belongs to the quantizer selector (Q SELECTOR) 407. The Q SELECTOR 407 is organized as a lookup table that is implemented in a read-only memory (ROM) 490. The 8 bits of the predicted value of only the sample that is currently being encoded are connected to an address port 491 of the ROM 490 to select therein one of 256 ROM locations 493. Each ROM location 493 contains a 4-bit group code 464 identifying one of the 16 quantization groups to which the predicted values belong. The selected group code 464 is output by the ROM 490 at its data port 492, and is supplied therefrom to the adaptive quantizer 402 and to a level coder 404.

TABLE 1

| Q LEVEL ERROR RANGE | −255 / −141 | −140 / −122 | −121 / −105 | −104 / −91 | −90 / −76 | −75 / −63 | −62 / −50 | −49 / −40 | −39 / −30 | −29 / −22 | −21 / −15 | −14 / −10 | −9 / −6 | −5 / −2 | −1 / 0 |
|---|---|---|---|---|---|---|---|---|---|---|---|---|---|---|---|
| REPRESENTATIVE VALUE | −149 | −131 | −113 | −97 | −83 | −69 | −56 | −44 | −34 | −25 | −18 | −11 | −7 | −3 | −1 |

| PREDICTED VALUE RANGE | Q SEL OUT | | | | | | | | | | | | | | | |
|---|---|---|---|---|---|---|---|---|---|---|---|---|---|---|---|---|
| 0–61 | 0 | | | | | | | | | | | | | | | X |
| 62–78 | 1 | | | | | | | | | | | | | | X | X |
| 79–92 | 2 | | | | | | | | | | | | | X | X | X |
| 93–104 | 3 | | | | | | | | | | | | X | X | X | X |
| 105–114 | 4 | | | | | | | | | | | X | X | X | X | X |
| 115–121 | 5 | | | | | | | | | | X | X | X | X | X | X |
| 122–125 | 6 | | | | | | | | | X | X | X | X | X | X | X |
| 126–127 | 7 | | | | | | | | X | X | X | X | X | X | X | X |
| 128–129 | 8 | | | | | | | X | X | X | X | X | X | X | X | X |
| 130–133 | 9 | | | | | | X | X | X | X | X | X | X | X | X | X |
| 134–140 | 10 | | | | | X | X | X | X | X | X | X | X | X | X | X |
| 141–150 | 11 | | | | X | X | X | X | X | X | X | X | X | X | X | X |
| 151–162 | 12 | | | X | X | X | X | X | X | X | X | X | X | X | X | X |
| 163–176 | 13 | | X | X | X | X | X | X | X | X | X | X | X | X | X | X |
| 177–193 | 14 | X | X | X | X | X | X | X | X | X | X | X | X | X | X | X |
| 194–255 | 15 | X | X | X | X | X | X | X | X | X | X | X | X | X | X | X |

| Q LEVEL ERROR RANGE | 0 / 1 | 2 / 5 | 6 / 9 | 10 / 14 | 15 / 21 | 22 / 29 | 30 / 39 | 40 / 49 | 50 / 62 | 63 / 75 | 76 / 90 | 91 / 104 | 105 / 121 | 122 / 140 | 141 / 255 |
|---|---|---|---|---|---|---|---|---|---|---|---|---|---|---|---|
| REPRESENTATIVE VALUE | 1 | 3 | 7 | 11 | 18 | 25 | 34 | 44 | 56 | 69 | 83 | 97 | 113 | 131 | 149 |

| PREDICTED VALUE RANGE | Q SEL OUT | | | | | | | | | | | | | | | |
|---|---|---|---|---|---|---|---|---|---|---|---|---|---|---|---|---|
| 0–61 | 0 | X | X | X | X | X | X | X | X | X | X | X | X | X | X | X |
| 62–78 | 1 | X | X | X | X | X | X | X | X | X | X | X | X | X | X | |
| 79–92 | 2 | X | X | X | X | X | X | X | X | X | X | X | X | X | | |
| 93–104 | 3 | X | X | X | X | X | X | X | X | X | X | X | | | | |
| 105–114 | 4 | X | X | X | X | X | X | X | X | X | X | | | | | |
| 115–121 | 5 | X | X | X | X | X | X | X | X | X | | | | | | |
| 122–125 | 6 | X | X | X | X | X | X | X | X | | | | | | | |
| 126–127 | 7 | X | X | X | X | X | X | X | X | | | | | | | |
| 128–129 | 8 | X | X | X | X | X | X | X | X | | | | | | | |
| 130–133 | 9 | X | X | X | X | X | X | X | | | | | | | | |
| 134–140 | 10 | X | X | X | X | X | X | | | | | | | | | |
| 141–150 | 11 | X | X | X | X | X | | | | | | | | | | |
| 151–162 | 12 | X | X | X | X | | | | | | | | | | | |
| 163–176 | 13 | X | X | X | | | | | | | | | | | | |
| 177–193 | 14 | X | X | | | | | | | | | | | | | |
| 194–255 | 15 | X | | | | | | | | | | | | | | |

As the Table 1 entries indicate, the quantization levels are not all of the same size. Rather, advantage has been taken of the fact that when the image is saturated near black or white, i.e., actual sample values are near 0 or 255, respectively, the eye finds it more difficult to distinguish between levels of contrast. Hence, progressively The adaptive quantizer 402 is also organized as a lookup table and is implemented in a ROM 450. The ROM 450 stores a plurality—in this example 16—of sets 460 of representative values of quantization levels of signal prediction errors, one set for each one of the 16 quantized groups of predicted sample values. The four bits of the group code from the Q SELECTOR 407 that is input to the adaptive quantizer 402 are connected to an address port 451 of the ROM 450 and form the most significant bits of a ROM address. This portion of the ROM address selects the one of the sets 460 of the error-representative values.

Applicant has concluded that the current predicted value, of the one sample that is currently being encoded, is the preferable selector of the error-representative value set. Hence, set selection is made on the basis of only the current predicted value, as opposed to on the basis of previous predicted values. This is accomplished by selecting a predicted value quantization group in the Q SELECTOR 407 on the basis of the predicted value of only the one sample that is currently being encoded, as was described above.

A representative value of the selected set 460 is selected in the ROM 450 by the error value that is input to the adaptive quantizer 402 from the difference circuit 401. The bits of the error value are connected to the address port 451 of the ROM 450 and form the least significant bits of a ROM address. The ROM location 453 that is addressed thereby stores the desired error-representative value of the selected set 460, and the ROM 450 outputs this value at its data port 452.

From the data port 452 of the ROM 450, the selected error-representative value is input to the level coder 404 and the summing circuit 403. The circuit 403 uses the error-representative value to modify the predicted value. The error-representative value is added by the summing circuit 403 to the predicted value to generate a reconstructed value of the sample. The reconstructed value is then input to the predictor 400. It is also input to the interpolation selector 113 and the DPCM encoders with limiter 111 and 112 (see FIG. 1).

The level coder 404 converts the error-representative value into a DCPM code that identifies the error-representative value. The coder 404 is also organized as a lookup table and is implemented in a ROM 470 which stores a plurality of sets 480 of DPCM codes. Since in this example there are 16 sets of 16 error-representative values, the ROM 470 stores 16 sets 480 of 16 DPCM codes. Since it takes 4 bits to represent 16 different error-representative values, each DPCM code in this example is a 4-bit code. The 4 bits of the group code from the Q SELECTOR 407 that is input to the coder 404 are connected to an address port 471 of the ROM 470 and form the most significant bits of a ROM address. This portion of the ROM address selects one of the 16 sets 480 of DPCM codes. (Since the receiver portion generates a duplicate of this portion of the ROM address, it is not necessary to transmit this information to the receiver portion, as will be made clear below.) The bits of the error-representative value are also connected to the address port 471 of the ROM 470, and they form the least significant bits of a ROM address. The address selects in the ROM 470 a location 473 that stores the desired DPCM code, and the ROM 470 outputs this DPCM code at its data port 472.

Referring now to FIG. 5 which shows a chrominance DPCM encoder with limiter, it may be seen that the chrominance encoders 111 and 112 are structured and function in a manner similar to the luminance encoder 110, but with certain enhancements. The basic operation of the encoders 111 and 112 is based upon the relationships that exist between a chrominance sample predicted value and actual value. These relationships are substantially the same as those described for luminance. However, whereas the luminance actual and predicted values cannot be negative, the chrominance actual and predicted values can be negative, and span the range of values from −255 to +255. Hence the possible range of the chrominance error values is from −510 to +510, or 1021 different values. But as with the luminance, the fact that the sum of the predicted value and the error-representative value must fall within the possible range of the actual value cuts the possible range of the chrominance error value at any particular predicted value to half of the total possible range, or 512 different values.

Since this range is twice the range of the luminance error values, this would seem to imply that for a given number of error range quantization levels, the quantization levels of the chrominance error values are twice as coarse as the quantization levels of the luminance error values. However, applicant has recognized that there are certain characteristics peculiar to the (R-Y) and (B-Y) chrominance signals which can be exploited to eliminate this difference in quantization level coarseness, and thereby to obtain better chrominance reconstruction and/or transmission bit rate reduction. These characteristics arise from the relationship between the (Y), (R-Y), and (B-Y) signals, which relationship is expressed by the following equations:

$Y = 0.3R + 0.59G + 0.11B$
$R - Y = 0.7R - 0.59G - 0.11B$
$B - Y = -0.3R - 0.59G + 0.89B$

Figure 6:
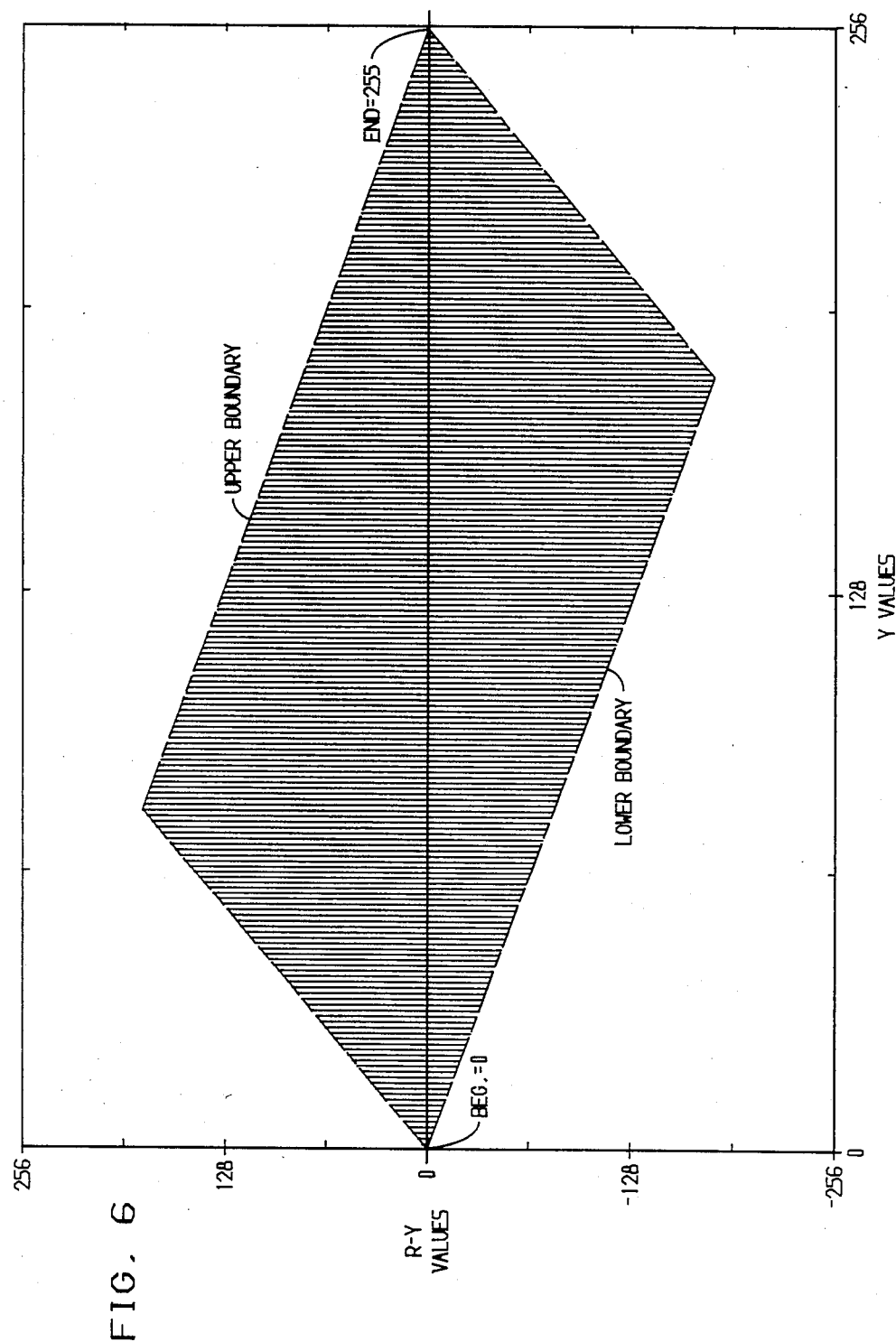
FIG. 6 is a relational diagram showing the relationship between luminance (Y) and chrominance (R-Y) sample values.
Figure 7:
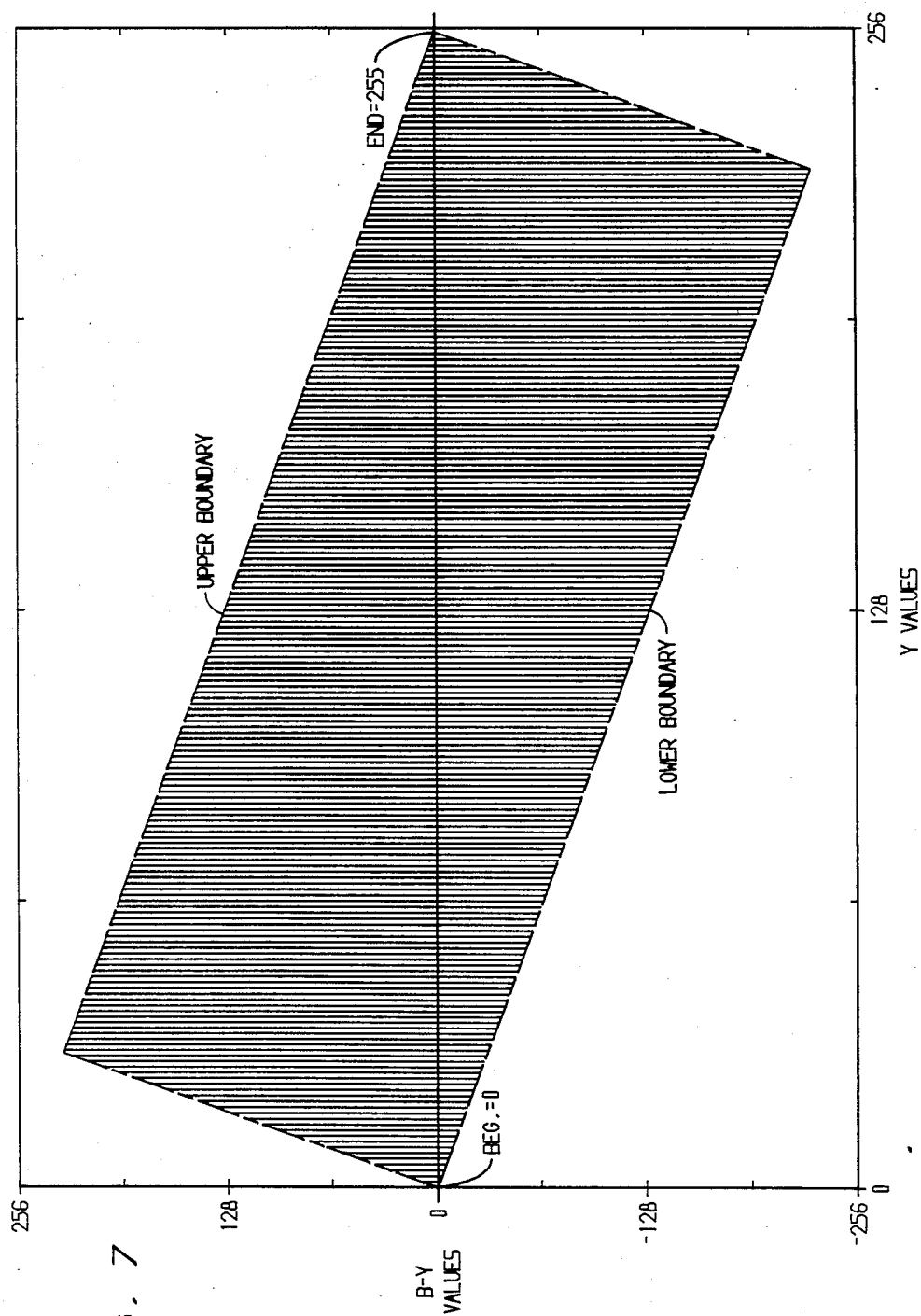
FIG. 7 shows the characteristic of the relationship between luminance (Y) and chrominance (B-Y) sample values.

Applicant has realized that, as a consequence of this relationship, the dynamic range of the (R-Y) and (B-Y) signals is bounded in a predetermined manner by the values of the luminance signal. The characteristic of the range of the (R-Y) signal is shown plotted against the range of the Y signal in FIG. 6, and the characteristic of the range of the (B-Y) signal is shown plotted against the range of the Y signal in FIG. 7. As these figures indicate, for any value of luminance the range of values of the chrominance is limited to at most 256 possible values. Hence, the luminance value imposes bounds on the range of the chrominance dynamic values that cut the chrominance dynamic range in half. Consequently, the possible range of the chrominance error value at any particular value of the luminance is cut in half, or to at most 256 different values. Thus, if the value of the luminance sample is used to impose bounds on the range of values of the corresponding chrominance samples, according to the characteristics of FIGS. 6 and 7, the coarseness of the chrominance error quantization levels is reduced to that of the luminance error quantization levels.

Returning to FIG. 5, the chrominance encoder includes a predictor 500, akin to the predictor 400 of the coder 110, for generating a predicted value for a chrominance sample. Since the predicted value is based upon the values of other, preceding, samples, it may range anywhere within the full dynamic range of the chrominance signals. The predicted value is therefore input to a limiter 505 whose function it is to bound the predicted value within the range determined by the characteristics of FIGS. 6 and 7, thereby to obtain a luminance-bounded predicted chrominance value. The limiter 505 includes an upper bound determining circuit 520 and a lower bound determining circuit 521. The circuits 520 and 521 implement the characteristic of FIG. 6 in the case of the encoder 111, and implement the characteristic of FIG. 7 in the case of the encoder 112. The characteristics are implemented as lookup tables in ROM. Each circuit 520 and 521 comprises a ROM 530 and 540, respectively, which ROMs comprise locations 533 and 543, respectively, each of which stores a value of the upper bound and the lower bound, respectively. Each ROM 530 and 540 stores the values of the upper and lower bounds of the chrominance samples, respectively, for each possible value of the corresponding luminance sample. The reconstructed value of the luminance sample, obtained from the luminance DPCM encoder 110, is input to address ports 531 and 541 of the ROMs 530 and 540, respectively, to select therein the locations 533 and 543, respectively, that store the corresponding chrominance upper and lower bound values, respectively, which are output at the data ports 532 and 542 of the ROMs 530 and 531, respectively.

From the circuits 520 and 521, the bound values are input to inputs of comparators 522 and 523, respectively, and to inputs of a multiplexer 524. The predicted value is input to the other inputs of the comparators 522 and 523 and to a third input of the multiplexer 524. The output of the comparator 522 indicates whether the predicted value exceeds the upper bound, and the output of the comparator 523 indicates whether the lower bound exceeds the predicted value. The outputs of the comparators 522 and 523 are connected to inputs of selection logic 525. The output of the logic 525 in turn connects to the select (SEL) input of the multiplexer 524. When the comparator 522 indicates that the predicted value exceeds the upper bound, the logic 525 causes the multiplexer 524 to select and output the value of the upper bound. When the comparator 523 indicates that the lower bound exceeds the predicted value, the logic 525 causes the multiplexer 524 to select and output the value of the lower bound. Thus, when the predicted value falls outside of the bounds, the limiter 505 substitutes for the predicted value the bound that is closest to the predicted value. And when the predicted value is indicated to fall within the bounds, the logic 525 causes the multiplexer 524 to select and output the predicted value. The output of the multiplexer 524, and hence of the limiter 505, is therefore a bounded predicted chrominance value.

The bounded predicted value is subtracted from the actual value at a difference circuit 501 to obtain an error value. The error value is input to an adaptive quantizer 502.

The chrominance bounded predicted value output by the limiter 505 is also added to the luminance reconstructed value at a summing circuit 506 to obtain a compensated chrominance value. The purpose of this summation is to compensate the predicted value for excursions that it may make into the negative number domain (see FIGS. 6 and 7), and make sure that the value lies in the value range 0 to 255. The compensated value is then input to the Q SELECTOR 507.

The Q SELECTOR 507 is like the Q SELECTOR 407 of the luminance coder 410. It outputs a 4-bit group code identifying the quantization group to which the input compensated value belongs. The group code is then input to an adaptive quantizer 502 and to a level coder 504.

The quantizer 502 is structured like the adaptive quantizer 402 of the coder 510. Because the chrominance signals tend to vary directly as the luminance signal, the ROM of the quantizer 502 of the DPCM encoders 111 and 112 may have the same contents as the ROM 450 of the quantizer 402 of the DPCM encoder 110.

However, the eye is not nearly as responsive to variations in chrominance signals as it is to variations in the luminance signal. Advantage may be taken of this fact to reduce the bit rate, by doubling the coarseness of the chrominance quantization levels and hence reducing in half the number of the levels and of the error-representative values that characterize them. The adaptive quantizer 502 in such case contains 16 sets of eight error-representative values. As only 3 bits are required to represent 8 values, the DPCM code output by the coder 504 in such a case is only a 3-bit code.

The group code from the Q SELECTOR 507 forms the most significant bits of the ROM address of the adaptive quantizer 502 and selects therein one of the sets of error-representative values. (As in the case of luminance, the receiver portion generates a duplicate of this portion of the ROM address, and hence it is likewise not necessary to transmit this information to the receiver portion.) The error value from the difference circuit 501 forms the least significant bits of the ROM address and selects in the adaptive quantizer 502 one of the error-representative values of the selected set. The selected error-representative value is output by the adaptive quantizer 502 to the coder 504 and to the summing circuit 503.

At the summing circuit 503, the selected error-representative value is added to the bounded predicted value to obtain a chrominance reconstructed value. The reconstructed value is then input to the predictor 500.

The coder 504 is like the coder 404 of the luminance DPCM encoder 110. It converts the error-representative value into a DPCM code. In this example, there are 16 representative values in each set of chrominance error-representative values, so the coder 504 converts the error-representative value into a 4-bit code. The group code from the Q SELECTOR 507 that is input to the coder 504 selects a set of DPCM codes, and the error-representative value selects from the selected set of codes the one code that identifies it. The selected DPCM code is then output by the coder 504.

Returning to FIG. 1, the interpolation selector 113 takes as its inputs every other luminance actual sample value and the luminance reconstructed sample values, and outputs interpolation codes (SELCODEs) for the input actual sample values. The interpolation selector 113 is a known apparatus. For each actual value of a luminance sample that it receives, the interpolation selector 113 interpolates reconstructed values of the samples that are horizontally-adjacent, vertically-adjacent, left-diagonally-adjacent, and right diagonally-adjacent to that sample. These interpolations are graphically suggested in FIG. 3 and designated therein as H, V, LD, and RD, respectively. The interpolation selector 113 then compares the interpolated values with the actual value to determine which interpolation method produces the closest value to the actual value. The interpolation selector 113 then puts out a 2-bit interpolation code (SELCODE) identifying that interpolation method, and discards the actual value. Another way of viewing the information carried by the 2-bit interpolation code is that it identifies the two samples whose values must be interpolated to reconstruct the value of the one sample that is adjacent to both of them.

The codes output by the DPCM encoders 110–112 and the interpolation selector 113 are input to a multiplexer 114 which combines them into a single digital signal stream. The multiplexer 114 feeds the signal stream into a buffer 115. A transmitter 116 retrieves the signals from the buffer 115 and transmits them onto a transmission link 200 having a transmission rate bandwidth of 45 MHz. The buffer 115 serves to smooth out the transmission rate, ensuring that the signal stream is output onto the link 200 at a constant rate even though the rate of output of the multiplexer 114 may be bursty, such as when only samples representing the viewable portion of a video source are encoded (i.e., "active only" video).

Turning now to FIG. 2, the signal stream transmitted on the link 200 is demultiplexed at the receiver into its constituent signals. The DPCM-encoded signals are decoded into reconstructed values of subsampled luminance and chrominance signals. The reconstructed values of the subsampled luminance signals are used to limit chrominance signal predicted values that are generated as part of the DPCM decoding process. The interpolation code (SELCODE) is used in conjunction with the reconstructed values of the subsampled luminance and chrominance signals to obtain by interpolation the values of the subsampled luminance and chrominance signals that were discarded at the transmitter portion. The interpolated and reconstructed signals are then multiplexed into reconstructed luminance and chrominance signals, and are converted from digital to analog form.

The signal stream that was transmitted on the link 200 is received by a receiver 216. The receiver 216 feeds the signal stream into a buffer 215, from whence the signals are retrieved by a demultiplexer 214. The buffer 215 allows the demultiplexer 214 to retrieve the signals at a rate different from the steady rate of transmission on the link 200, such as in a burst mode. The demultiplexer 214 separates the signal stream into its constituent codes. The luminance DPCM code is input to a DPCM decoder 210 and the chrominance DPCM codes are input each to one DPCM decoder with limiter 211 and 212.

The decoders 210-212 reconstruct sample values from the incoming DPCM codes. In particular, a DPCM decoder converts an incoming DPCM code into an error-representative value identified by the code, derives a predicted value of a sample from the values of preceding sample values, and modifies the predicted value by the error-representative value to obtain a reconstructed value of the sample. The configuration of the luminance DPCM decoder 210 is shown in FIG. 8, while the configuration of the chrominance DPCM decoders with limiter 211 and 212 is shown in FIG. 9.

Figure 8:
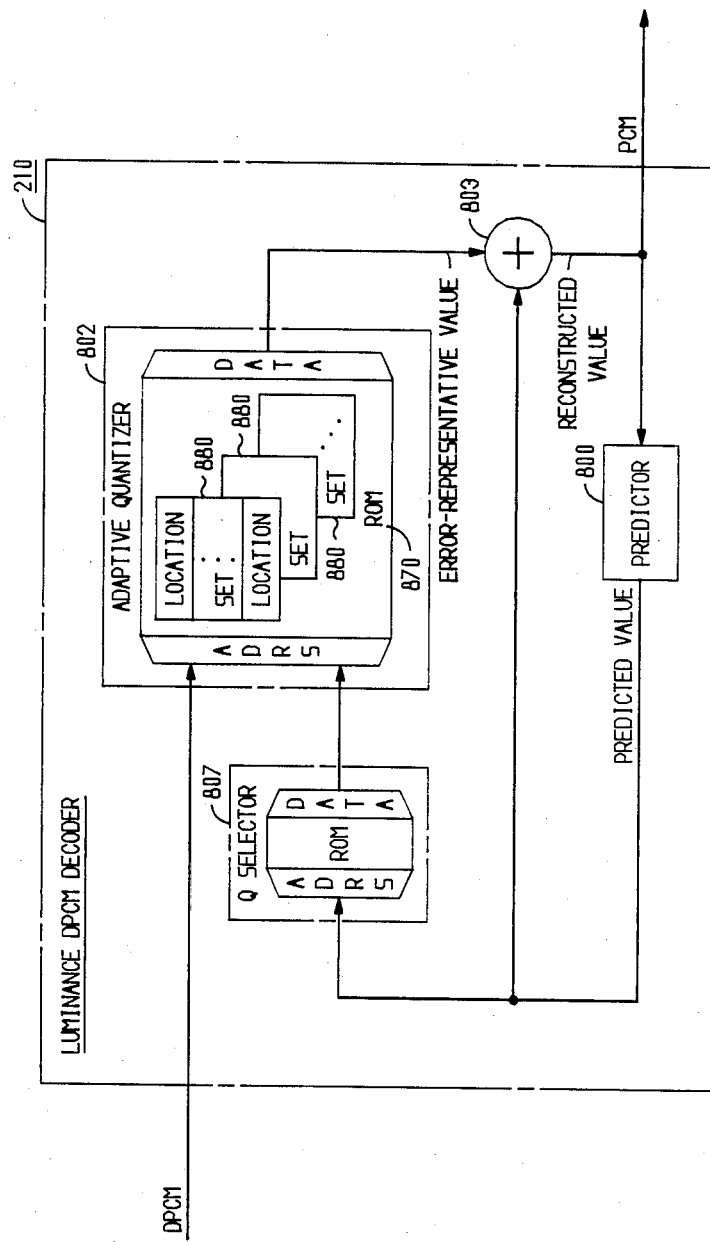
FIG. 8 is a block diagram of the luminance DPCM decoder of FIG. 2.
Figure 9:
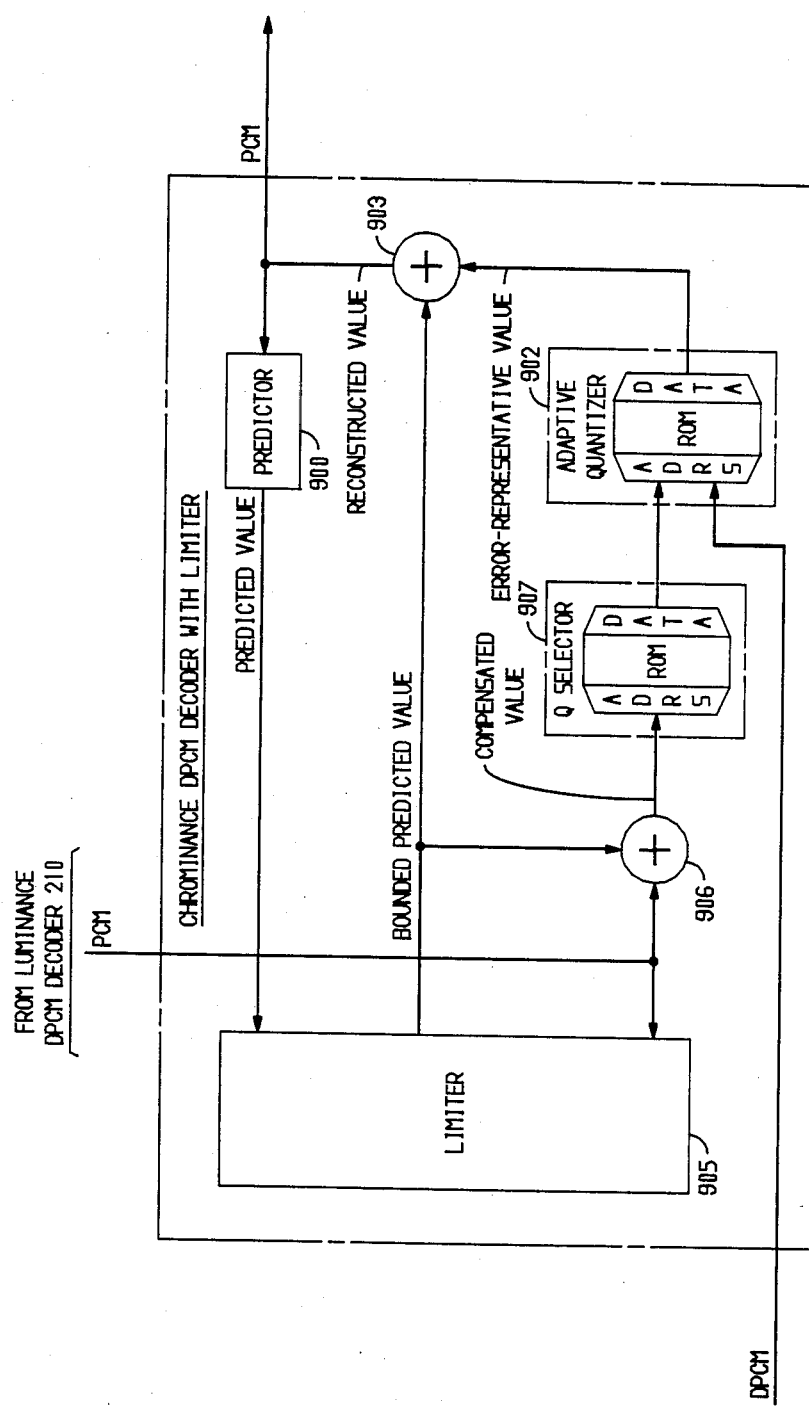
FIG. 9 is a block diagram of a chrominance DPCM decoder with limiter of FIG. 2.

Turning now to FIG. 8, the luminance DPCM decoder 210 that is shown there includes a conventional predictor 800 that predicts the value for a luminance sample from the values of preceding luminance reconstructed samples. The predictor 800 duplicates th predictor 400 of the encoder 110 to ensure that the predicted value for a sample is always the same at both the encoder 110 and the decoder 210.

The predicted value output by the predictor 800 is input to a quantizer selector (Q SELECTOR) 807 and to a sum circuit 803. The Q SELECTOR 807 is a duplicate of the Q SELECTOR 407. Its group code output is input to an adaptive quantizer 802, as is the luminance DPCM code from the demultiplexer 214.

The quantizer 803 is the converse of the coder 404. It converts the DPCM code back into the error-representative value represented by that code. The quantizer 802 is implemented as a table lookup ROM 870 containing 16 sets 880 of 16 error-representative values. The group code output by the Q SELECTOR 807 selects one of the sets 880 while the DPCM code selects one of the error-representative values of the selected set 880. The error-representative value output by the quantizer 802 in response to the DPCM code is the same as the error-representative value that was output by the quantizer 402 and that resulted in generation of the DPCM code in the DPCM encoder 110.

At the summing circuit 803, the error-representative value is added to the predicted value generated by the predictor 800 to generate a reconstructed value for the sample. The reconstructed value is input to the predictor 800 and to circuitry outside of the decoder 210. As further discussion will show, the luminance reconstructed values generated by the decoder 210 are the basis for reconstruction by interpolation of values of other luminance and the chrominance samples.

Turning to FIG. 9, the chrominance DPCM decoder with limiter that is shown there includes a conventional predictor 900 for predicting the value of a chrominance sample from the values of preceding chrominance samples. The predictor 900 duplicates the predictor 500 of the coder of FIG. 5. The predicted value output by the predictor 900 is input to a limiter 905 which is a duplicate of the limiter 505 of FIG. 5. The limiter 905 takes as a second input the luminance reconstructed value from the decoder 210, and produces a bounded predicted value that is input to summing circuits 906 and 903.

The function of the summing circuit 906 is the same as that of the summing circuit 506 in FIG. 5. The circuit 906 adds the reconstructed luminance value from the decoder 210 to the bounded predicted value and outputs the resulting compensated value to a Q SELECTOR 907.

The Q SELECTOR 907 duplicates the Q SELECTOR 507 of FIG. 5. The group code generated thereby is input to an adaptive quantizer 902, as is the DPCM-encoded chrominance error code from the multiplexer 214.

The quantizer 902 is like the quantizer 802 and is the converse of the coder 504. It converts the DPCM error code back into an error-representative value. The group code output of the Q SELECTOR 907 serves to select one of the 16 sets of 16 error-representative values held by the quantizer 902, while the DPCM code selects one of the error-representative values of the selected set. The error-representative value that is output by the quantizer 902 in response to a DPCM code is the same as the error-representative value output by the quantizer 502 that resulted in generation of the DPCM code in the DPCM encoder of FIG. 5.

At the summing circuit 903, the error-representative value is added to the predicted value to generate a reconstructed value for the sample. The reconstructed value is input to the predictor 900 and to circuitry outside of the decoder of FIG. 9.

Returning to a consideration of FIG. 2, the reconstructed values output by the decoders 210-212 are input to multiplexers 204-206, respectively, and to interpolators 207-209, respectively.

The interpolators 207-209 are conventional. They take as their second input the interpolation code (SELCODE) form the demultiplexer 214, and interpolate the reconstructed values of samples identified by that code to obtain values for samples whose values were discarded at the subsamplers and the interpolation selector of FIG. 1. Even though the interpolation code was computed in FIG. 1 for luminance only, it is used in FIG. 2 to obtain values of both luminance and chrominance samples. Luminance-based prediction of chrominance is made possible by the fact that spatial changes in the luminance are generally accompanied by like spatial changes in the chrominance, and hence values of adjacent chrominance samples tend to have the same relationship to each other as do values to corresponding adjacent luminance samples. Hence each interpolator 207-209 interpolates a sample value from reconstructed values of adjacent samples obtained from the decoders 210-212, respectively, by performing the type of interpolation, i.e., by using those adjacent values, specified by the interpolation code.

Since the reconstructed value of every other sample is obtained by interpolation, the values obtained by interpolation are input from the interpolators 207-209 to the multiplexers 204-206, respectively, where they are multiplexed with the reconstructed values obtained by the decoders 210-212, respectively. The multiplexors 204-206 produce streams of values wherein values of adjacent samples are arranged in their proper order, by alternating each value generated by the decoder 210-212, respectively, with a value generated by the interpolator 207-209, respectively.

The output streams of the multiplexers 204-206 are still in digital, PCM-encoded, format. Hence they are processed through D/A converters 201-203, respectively, wherein they are reconverted back into analog form. The D/A converters 201-203 are conventional devices. Each comprises a digital-to-analog domain converter, such as an R-2R network 190, followed by a low-pass filter 191 having the same pass band as the low-pass filter of the corresponding A/D converter of FIG. 1. The outputs of the D/A converters 201-203 are reconstructed analog luminance and chrominance signals, designated Y', (R-Y)', and (B-Y)', respectively. They are substantial replicas of the signals Y,(R-Y), and (B-Y) that were input to FIG. 1.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. An arrangement for transmitting component video signals in digital form, comprising for each chrominance video component signal:
   first operational means, for predicting a value of the chrominance video component signal;
   second operational means, for determining upper bound and lower bound of the value of the chrominance signal on the basis of a value of a corresponding luminance component video signal;
   third operational means, coupled to the first and the second means, for determining whether the predicted value of the chrominance signal falls between the upper and the lower bounds;
   fourth operational means, coupled to the third means, for substituting for the predicted value of the chrominance signal the bound closest to the predicted value when the predicted value is determined to fall outside of the upper and the lower bounds, to obtain a bounded predicted value of the chrominance signal; and
   fifth operational means, coupled to the fourth means, for generating a signal representing difference between the bounded predicted value and an actual value of the chrominance signal; and the arrangement further comprising:
   sixth operational means, for generating a signal indicative of a value of a luminance video component signal; and
   seventh operational means, coupled to each fifth means and to the sixth means, for transmitting on a transmission medium the generated signals.

2. The arrangement of claim 1 wherein each fifth means comprise:
   a plurality of sets of representative values of quantization levels of chrominance prediction errors;
   eighth operational means, coupled to the plurality of sets and to the fourth means, for selecting a set of the chrominance error-representative values on the basis of only the bounded predicted value of the chrominance signal;
   ninth operational means, coupled to the selected set and to the fourth means, for selecting a chrominance error-representative value from the selected set of chrominance error-representative values on the basis of the difference between the bounded predicted value of the chrominance signal and the actual value of the chrominance signal; and
   tenth operational means, responsive to the selected value, for generating a signal indicating the selected chrominance error-representative value.

3. The arrangement of claim 2 wherein each eighth means comprise:
   a plurality of quantization groups of predicted values of chrominance signals;
   eleventh operational means, coupled to the plurality of groups and to the fourth means, for selecting a quantization group on the basis of only the bounded predicted value of the chrominance signal; and
   twelfth operational means, coupled to the plurality of sets and responsive to the selected group, for selecting a set of the chrominance error-representative values on the basis of the selected quantization group.

4. The arrangement of claim 2 wherein each plurality of sets of error-representative values comprise:
   a plurality of sets of chrominance error-representative values each associated with at least one predicted value of chrominance signals, the error-representative values of each set representing quantization levels that together span a range of chrominance prediction error values bounded by an error value that is a maximum allowed for any predicted value of the at least one predicted value and an error value that is a minimum allowed for any predicted value of the at least one predicted value.

5. The arrangement of claim 2 wherein each eighth means comprise:
   eleventh operational means, coupled to the plurality of sets and to the fourth means, for selecting a set of the chrominance error-representative values on the basis of the sum of only the bounded predicted value of the chrominance signal and the value of the corresponding luminance signal.

6. An arrangement for transmitting component video signals in digital form, comprising for each video component signal:
   first operational means, for predicting a value of a first sample of the component video signal;
   a plurality of sets of representative values of quantization levels of signal prediction errors;
   second operational means, coupled to the first means and to the plurality of sets, for selecting a set of the signal error-representative values on the basis of the predicted value of only the first sample of the signal;
   third operational means, coupled to the first means and to the selected set, for selecting a signal error-representative value from the selected set of signal error-representative values on the basis of difference between the predicted value and an actual value of the first sample of the signal; and
   fourth operational means, responsive to the selected value, for generating a code indicating the selected signal error-representative value; and the arrangement further comprising:
   fifth operational means, coupled to each fourth means, for transmitting on a communication medium the generated codes.

7. The arrangement of claim 6 wherein at least one second means comprise:
   a plurality of quantization groups of predicted values of samples of the signal;
   sixth operational means, coupled to the plurality of groups and to the first means, for selecting a quantization group on the basis of the predicted value of only the first sample of the signal; and
   seventh operational means, coupled to the plurality of sets and responsive to the selected group, for selecting a set of the signal error-representative values on the basis of the selected quantization group.

8. The arrangement of claim 6 wherein at least one plurality of sets of error-representative values comprises:
   a plurality of sets of signal error-representative values each associated with at least one predicted value of first samples of the signal, the error-representative values of each set representing quantization levels that together span a range of signal prediction error values bounded by an error value that is a maximum allowed for any predicted value of the at least one predicted value and an error value that is a minimum allowed for any predicted value of the at least one predicted value.

9. The arrangement of claim 6 further comprising for at least one video component signal:
   sixth operational means, coupled to the first means and responsive to the selected value, for reconstructing a value of the first sample of the signal from the predicted value of the first sample of the signal and the selected signal error-representative value;
   seventh operational means, coupled to the sixth means, for interpolating the reconstructed value of at least one first sample of the signal to obtain a plurality of interpolated values of a second sample of the signal;
   eighth operational means, coupled to the seventh means, for generating a code indicating which one of the plurality of interpolated values of the second sample of the signal compares closest with an actual value of the second sample of the signal; and
   ninth operational means, coupled to the eighth means and to the third means, for channeling actual values of adjacent samples of the signal to different ones of the third means and the eighth means.

10. An arrangement for transmitting component video signals in digital form, comprising for each first video component signal:
    first operational means, for predicting a value of a first sample of a first component video signal;
    second operational means, for determining upper bound and lower bound of the value of the first sample of the first signal on the basis of a reconstructed value of a corresponding sample of a second component video signal;
    third operational means, coupled to the first and to the second means, for determining whether the predicted value of the first sample of the first signal falls between the upper and the lower bounds;
    fourth operational means, coupled to the third means, for substituting for the predicted value of the first sample of the first signal the bound closest to the predicted value when the predicted value is determined to fall outside of the upper and the lower bounds, to obtain a bounded predicted value of the first sample of the first signal;
    a plurality of sets of representative values of quantization levels of first signal prediction errors;
    fifth operational means, coupled to the fourth means and to the plurality of sets, for selecting a set of the first signal error-representative values on the basis of the bounded predicted value of only the first sample of the first signal;
    sixth operational means, coupled to the selected set and to the fourth means, for selecting a first signal error-representative value from the selected set of first signal error-representative values on the basis of the difference between the bounded predicted value of the first sample of the first signal and an actual value of the first sample of the first signal;
    seventh operational means, responsive to the selected value, for generating a first code indicating the selected first signal error-representative value; and
    eighth operational means, coupled to the sixth means, for channeling actual values of alternate adjacent samples of the first component video signal to the sixth means; and the arrangement further comprising:
    ninth operational means, for generating a second code indicative of a value of a sample of the second video component signal; and
    tenth operational means, coupled to each seventh means and to the ninth means, for transmitting on a communication link the generated codes.

11. The arrangement of claim 10 wherein each fifth means comprise:
    eleventh operational means, coupled to the fourth means and to the plurality of sets, for selecting a set of the first signal error-representative values on the basis of the sum of the bounded predicted value of only the first sample of the first signal and the reconstructed value of the corresponding sample of the second signal.

12. The arrangement of claim 10 wherein the ninth means comprise:
    eleventh operational means, for predicting a value of a first sample of a second component video signal;
    a plurality of sets of representative values of quantization levels of second signal prediction errors;

twelfth operational means, coupled to the plurality of sets and to the eleventh means, for selecting a set of the second signal error-representative values on the basis of the predicted value of only the first sample of the second signal;

thirteenth operational means, coupled to the selected set and to the eleventh means, for selecting a second signal error-representative value from the selected set of second signal error-representative values on the basis of the difference between the predicted value and an actual value of the first sample of the second signal;

fourteenth operational means, responsive to the selected value, for generating the second code indicating the selected second signal error-representative value;

fifteenth operational means, coupled to the eleventh means and responsive to the selected value, for reconstructing a value of the first sample of the second signal from the predicted value of the first sample of the second signal and the selected first signal error-representative value to obtain the reconstructed value of the second signal;

sixteenth operational means, coupled to the fifteenth means, for interpolating the reconstructed value of at least one first sample of the second signal to obtain a plurality of interpolated values of a second sample of the second component video signal;

seventeenth operational means, coupled to the sixteenth means, for generating a third code indicating which one of the plurality of interpolated values of the second sample of the second signal compares closest with an actual value of the second sample of the second signal; and eighteenth operational means, coupled to the thirteenth and the seventeenth means, for channeling actual values of adjacent first and second samples of the second component video signal to different ones of the thirteenth means and the seventeenth means.

13. The arrangement of claim 12 wherein each means for predicting a value of a sample comprise:
means for predicting the value of the sample from the reconstructed value of at least one preceding sample of the signal.

14. The arrangement of claim 12 wherein
the twelfth means comprise
a plurality of quantization groups of predicted values of second signal samples,
nineteenth operational means, coupled to the plurality of groups and to the eleventh means, for selecting a second signal quantization group on the basis of the predicted value of only the first sample of the second signal, and
twentieth operational means, coupled to the plurality of sets and responsive to the selected group, for selecting a set of the second signal error-representative values on the basis of the selected second signal quantization group; and wherein
the fifth means comprise
a plurality of quantization groups of predicted values of first signal samples,
twenty-first operational means, coupled to the plurality of groups and to the fourth and the fifteenth means, for selecting a first signal quantization group on the basis of the sum of the bounded predicted value of only the first sample of the first signal and the reconstructed value of the corresponding sample of the second signal, and
twenty-second operational means, coupled to the plurality of sets and responsive to the selected group, for selecting a set of the first signal error-representative values on the basis of the selected first signal quantization group.

15. The arrangement of claim 12 wherein the plurality of sets of each signal's error-representative values comprise:
a plurality of sets of that signal's error-representative values each associated with at least one predicted value of first samples of that signal, the error-representative values of each set representing quantization levels that together span a range of that signal's prediction error values bounded by an error value that is a maximum allowed for any predicted value of the at least one predicted value of that signal and an error value that is a minimum allowed for any predicted value of the at least one predicted value of that signal.

16. An arrangement for receiving digital component video signals, comprising for each chrominance video component signal:
first operational means, for predicting a value of the chrominance video component signal;
second operational means, for determining upper bound and lower bound of the value of the chrominance signal on the basis of a value of a corresponding luminance component video signal;
third operational means, coupled to the first and the second means, for determining whether the predicted value of the chrominance signal falls between the upper and the lower bounds;
fourth operational means, coupled to the third means, for substituting for the predicted value of the chrominance signal the bound closest to the predicted value when the predicted value is determined to fall outside of the upper and the lower bounds, to obtain a bounded predicted value of the chrominance signal; and
fifth operational means, coupled to the fourth means, for modifying the bounded predicted value of the chrominance signal by an error value represented by a first received signal, to generate a reconstructed value of the chrominance component video signal; and the arrangement further comprising:
sixth operational means, for generating a reconstructed value of a luminance video component signal on the basis of a second received signal; and
seventh operational means, coupled to the fifth and the sixth means, for receiving the first and the second signals from a transmission medium and transferring the received first and second signals to the fifth and the sixth means, respectively.

17. The arrangement of claim 16 wherein each fifth means comprise:
a plurality of sets of representative values of quantization levels of chrominance prediction errors;
eighth operational means, coupled to the plurality of sets and to the fourth means, for selecting a set of the chrominance error-representative values on the basis of only the bounded predicted value of the chrominance signal;
ninth operational means, coupled to the selected set and to the seventh means, for selecting a chrominance error-representative value from the selected set of chrominance error-representative values on the basis of the first received signal indicative of the chrominance error-representative value; and tenth operational means, coupled to the fourth means and responsive to the selected value, for modifying the bounded predicted value of the chrominance signal by the selected chrominance error-representative value to generate a reconstructed value of the chrominance component video signal.

18. The arrangement of claim 17 wherein each eighth means comprise:

a plurality of quantization groups of predicted values of chrominance signals;

eleventh operational means, coupled to the plurality of groups and to the fourth means, for selecting a quantization group on the basis of only the bounded predicted value of the chrominance signal; and twelfth operational means, coupled to the plurality of sets and responsive to the selected group, for selecting a set of the chrominance error-representative values on the basis of the selected quantization group.

19. The arrangement of claim 17 wherein each plurality of sets of error-representative values comprise:

a plurality of sets of chrominance error-representative values each associated with at least one predicted value of chrominance signals, the error-representative values of each set representing quantization levels that together span a range of chrominance prediction error values bounded by an error value that is a maximum allowed for any predicted value of the at least one predicted value and an error value that is a minimum allowed for any predicted value of the at least one predicted value.

20. The arrangement of claim 17 wherein each eighth means comprise:

eleventh operational means, coupled to the plurality of sets and to the fourth means, for selecting a set of the chrominance error-representative values on the basis of the sum of only the bounded predicted value of the chrominance signal and the value of the corresponding luminance signal.

21. An arrangement for receiving digital component video signals, comprising for each video component signal:

first operational means, for predicting a value of a first sample of the component video signal;

a plurality of sets of representative values of quantization levels of signal prediction errors;

second operational means, coupled to the first means and to the plurality of sets, for selecting a set of the signal error-representative values on the basis of the predicted value of only the first sample of the signal;

third operational means, coupled to the first means and to the selected set, for selecting a signal error-representative value from the selected set of signal error-representative values on the basis of a received code indicative of the signal error-representative value; and fourth operational means, coupled to the first means and responsive to the selected value, for modifying the predicted value of the first sample of the signal by the selected signal error-representative value to generate a reconstructed value of the first sample of the signal; and the arrangement further comprising:

fifth operational means, coupled to each third means, for receiving codes from a communication medium and transferring the received codes to the third means.

22. The arrangement of claim 21 wherein at least one second means comprise:

a plurality of quantization groups of predicted values of samples of the signal;

sixth operational means, coupled to the plurality of groups and to the first means, for selecting a quantization group on the basis of the predicted value of only the first sample of the signal; and seventh operational means, coupled to the plurality of sets and responsive to the selected group, for selecting a set of the signal error-representative values on the basis of the selected quantization group.

23. The arrangement of claim 21 wherein at least one plurality of sets of error-representative values comprise:

a plurality of sets of signal error-representative values each associated with at least one predicted value of first samples of the signal, the error-representative values of each set representing quantization levels that together span a range of signal prediction error values bounded by an error value that is a maximum allowed for any predicted value of the at least one predicted value and an error value that is a minimum allowed for any predicted value of the at least one predicted value.

24. The arrangement of claim 21 further comprising for at least one video component signal:

sixth operational means, coupled to the fourth means, for interpolating the reconstructed value of at least one first sample of the signal specified by a received code to obtain a reconstructed value of a second sample of the signal adjacent to the first sample of the signal; and seventh operational means, coupled to the fourth and the sixth means, for generating a stream of the reconstructed values of alternating first and second samples of the signal.

25. An arrangement for receiving digital component video signals, comprising for each first video component signal:

first operational means, for predicting a value of a first sample of a first component video signal;

second operational means, for determining upper bound and lower bound of the value of the first sample of the first signal on the basis of a reconstructed value of a corresponding sample of a second component video signal;

third operational means, coupled to the first and the second means, for determining whether the predicted value of the first sample of the first signal falls between the upper and the lower bounds;

fourth operational means, coupled to the third means, for substituting for the predicted value of the first sample of the first signal the bound closest to the predicted value when the predicted value is determined to fall outside of the upper and the lower bounds, to obtain a bounded predicted value of the first sample of the first signal;

a plurality of sets of representative values of quantization levels of first signal prediction errors;

fifth operational means, coupled to the fourth means and to the plurality of sets, for selecting a set of the first signal error-representative values on the basis of only the bounded predicted value of only the first sample of the first signal;

sixth operational means, coupled to the selected set for selecting a first signal error-representative value from the selected set of first signal error-representative values on the basis of a received first code indicative of the first signal error-representative value;

seventh operational means, coupled to the first means and responsive to the selected value, for modifying the bounded predicted value of the first sample of the first signal by the selected error-representative value of the first signal to generate a reconstructed value of the first sample of the first signal;

eighth operational means, for generating a reconstructed value of a second sample of the first signal adjacent to the first sample of the first signal from a reconstructed value of at least one first sample of the first signal specified by a received second code; and ninth operational means, coupled to the seventh and the eighth means, for generating a stream of the reconstructed values of alternating first and second samples of the first signal; and the arrangement further comprising:

tenth operational means, for generating a reconstructed value of a sample of the second component video signal on the basis of a received third code; and eleventh operational means, coupled to each sixth, each eighth, and the tenth means, for receiving the first, the second, and the third codes from a communication link and for transferring the codes to the sixth, the eighth, and the tenth means, respectively.

26. The arrangement of claim 25 wherein each fifth means comprise:

twelfth operational means, coupled to the fourth means, to the tenth means, and to the plurality of sets, for selecting a set of the first signal error-representative values on the basis of the sum of the bounded predicted value of only the first sample of the first signal and the reconstructed value of the corresponding sample of the second signal.

27. The arrangement of claim 25 wherein the tenth means comprise:

twelfth operational means, for predicting a value of a first sample of a second component video signal;

a plurality of sets of representative values of quantization levels of second signal prediction errors;

thirteenth operational means, coupled to the twelfth means and to the plurality of sets, for selecting a set of the second signal error-representative values on the basis of the predicted value of only the first sample of the second signal;

fourteenth operational means, coupled to the eleventh means and to the selected set, for selecting a second signal error-representative value from the selected set of second signal error-representative values on the basis of a received third code indicative of the second signal error-representative value;

fifteenth operational means, coupled to the twelfth means and responsive to the selected value, for modifying the predicted value of the first sample of the second signal by the selected error-representative value of the second signal to generate a reconstructed value of the first sample of the second signal;

sixteenth operational means, coupled to the fifteenth means, for generating a reconstructed value of a second sample of the second signal adjacent to the first sample of the second signal from the reconstructed value of at least one first sample of the second signal which bears same relation to the second sample of the second signal as the at least one first sample of the first signal specified by the received second code bears to the second sample of the first signal reconstructed therefrom; and seventeenth operational means, coupled to the fifteenth and the sixteenth means, for generating a stream of the reconstructed values of alternating first and second samples of the second signal.

28. The arrangement of claim 27 wherein each means for predicting a value of a sample comprise:

means for predicting the value of the sample from the reconstructed value of at least one preceding sample of the signal.

29. The arrangement of claim 27 wherein the thirteenth means comprise a plurality of quantization groups of predicted values of second signal samples, eighteenth operational means, coupled to the twelfth means and to the plurality of groups for selecting a second signal quantization group on the basis of the predicted value of only the first sample of the second signal, and nineteenth operational means, coupled to the plurality of sets and responsive to the selected group, for selecting a set of the second signal error-representative values on the basis of the selected second signal quantization group; and wherein the fifth means comprise a plurality of quantization groups of predicted values of first signal samples, twentieth operational means, coupled to the plurality of groups and to the fourth and the fifteenth means, for selecting a first signal quantization group on the basis of the sum of the bounded predicted value of only the first sample of the first signal and the reconstructed value of the corresponding sample of the second signal, and twenty-first operational means, coupled to the plurality of sets and responsive to the selected group, for selecting a set of the first signal error-representative values on the basis of the selected first signal quantization group.

30. The arrangement of claim 27 wherein the plurality of sets of each signal's error-representative values comprise:

a plurality of sets of that signal's error-representative values each associated with at least one predicted value of first samples of that signal, the error-representative values of each set representing quantization levels that together span a range of that signal's prediction error values bounded by an error value that is a maximum allowed for any predicted value of the at least one predicted value of that signal and an error value that is a minimum allowed for any predicted value of the at least one predicted value of that signal.

31. An apparatus for encoding at least one digital component video chrominance signal, comprising:

first operational means, for predicting a value of a chrominance video component signal;

second operational means, for determining upper bound and lower bound of the value of the chrominance signal on the basis of a value of a corresponding luminance component video signal;

third operational means, coupled to the first and the second means, for determining whether the predicted value of the chrominance signal falls between the upper and the lower bounds;

fourth operational means, coupled to the third means, for substituting for the predicted value of the chrominance signal the bound closest to the predicted value when the predicted value is determined to fall outside of the upper and the lower bounds, to obtain a bounded predicted value of the chrominance signal; and fifth operational means, coupled to the fourth means, for generating a signal representing difference between the bounded predicted value and an actual value of the chrominance signal.

32. The arrangement of claim 31 wherein the fifth means comprise:

a plurality of sets of representative values of quantization levels of chrominance prediction errors;

sixth operational means, coupled to the plurality of sets and to the fourth means, for selecting a set of the chrominance error-representative values on the basis of only the bounded predicted value of the chrominance signal;

seventh operational means, coupled to the selected set and to the fourth means, for selecting a chrominance error-representative value from the selected set of chrominance error-representative values on the basis of the difference between the bounded predicted value of the chrominance signal and the actual value of the chrominance signal; and eighth operational means, responsive to the selected value, for generating a signal indicating the selected chrominance error-representative value.

33. The arrangement of claim 32 wherein the sixth means comprise:

a plurality of quantization groups of predicted values of chrominance signals;

ninth operational means, coupled to the plurality of groups and to the fourth means, for selecting a quantization group on the basis of only the bounded predicted value of the chrominance signal; and tenth operational means, coupled to the plurality of sets and responsive to the selected group, for selecting a set of the chrominance error-representative values on the basis of the selected quantization group.

34. The arrangement of claim 32 wherein the plurality of sets of error-representative values comprise:

a plurality of sets of chrominance error-representative values each associated with at least one predicted value of chrominance signals, the error-representative values of each set representing quantization levels that together span a range of chrominance prediction error values bounded by an error value that is a maximum allowed for any predicted value of the at least one predicted value and an error value that is a minimum allowed for any predicted value of the at least one predicted value.

35. The arrangement of claim 32 wherein the sixth means comprise:

ninth operational means, coupled to the plurality of sets and to the fourth means, for selecting a set of the chrominance error-representative values on the basis of the sum of only the bounded predicted value of the chrominance signal and the value of the corresponding luminance signal.

36. An apparatus for encoding at least one digital signal, comprising:

first operational means, for predicting a value of a first sample of a signal;

a plurality of sets of representative values of quantization levels of signal prediction errors;

second operational means, coupled to the first means and to the plurality of sets, for selecting a set of the signal error-representative values on the basis of the predicted value of only the first sample of the signal;

third operational means, coupled to the first means and to the selected set, for selecting a signal error-representative value from the selected set of signal error-representative values on the basis of difference between the predicted value and an actual value of the first sample of the signal; and fourth operational means, responsive to the selected value, for generating a code indicating the selected signal error-representative value.

37. The arrangement of claim 36 wherein the second means comprise:

a plurality of quantization groups of predicted values of signal samples;

fifth operational means, coupled to the plurality of groups and to the first means, for selecting a quantization group on the basis of the current predicted value of only the first sample of the signal; and sixth operational means, coupled to the plurality of sets and responsive to the selected group, for selecting a set of the signal error-representative values on the basis of the selected quantization group.

38. The arrangement of claim 36 wherein the plurality of sets of error-representative values comprise:

a plurality of sets of signal error-representative values each associated with at least one predicted value of first samples of the signal, the error-representative values of each set representing quantization levels that together span a range of signal prediction error values bounded by an error value that is a maximum allowed for any predicted value of the at least one predicted value and an error value that is a minimum allowed for any predicted value of the at least one predicted value.

39. An apparatus for decoding at least one encoded digital component video chrominance signal, comprising:

first operational means, for predicting a value of a chrominance video component signal;

second operational means, for determining upper bound and lower bound of the value of the chrominance signal on the basis of a value of a corresponding luminance component video signal;

third operational means, coupled to the first and the second means, for determining whether the predicted value of the chrominance signal falls between the upper and the lower bounds;

fourth operational means, coupled to the third means, for substituting for the predicted value of the chrominance signal the bound closest to the predicted value when the predicted value is determined to fall outside of the upper and the lower bounds, to obtain a bounded predicted value of the chrominance signal; and fifth operational means, coupled to the fourth means, for modifying the bounded predicted value of the chrominance signal by an error value represented by a first received signal, to generate a reconstructed value of the chrominance component video signal.

40. The arrangement of claim 39 wherein the fifth means comprise:
- a plurality of sets of representative values of quantization levels of chrominance prediction errors;
- sixth operational means, coupled to the plurality of sets and to the fourth means, for selecting a set of the chrominance error-representative values on the basis of only the bounded predicted value of the chrominance signal;
- seventh operational means, coupled to the selected set, for selecting a chrominance error-representative value from the selected set of chrominance error-representative values on the basis of the first received signal indicative of the chrominance error-representative value; and
- eighth operational means, coupled to the fourth means and responsive to the selected value, for modifying the bounded predicted value of the chrominance signal by the selected chrominance error-representative value to generate a reconstructed value of the chrominance component video signal.

41. The arrangement of claim 40 wherein the sixth means comprise:
- a plurality of quantization groups of predicted values of chrominance signals;
- ninth operational means, coupled to the plurality of groups and to the fourth means, for selecting a quantization group on the basis of only the bounded predicted value of the chrominance signal; and
- tenth operational means, coupled to the plurality of sets and responsive to the selected group, for selecting a set of the chrominance error-representative values on the basis of the selected quantization group.

42. The arrangement of claim 40 wherein the plurality of sets of error-representative values comprise:
- a plurality of sets of chrominance error-representative values each associated with at least one predicted value of chrominance signals, the error-representative values of each set representing quantization levels that together span a range of chrominance prediction error values bounded by an error value that is a maximum allowed for any predicted value of the at least one predicted value and an error value that is a minimum allowed for any predicted value of the at least one predicted value.

43. The arrangement of claim 40 wherein the sixth means comprise:
- ninth operational means, coupled to the plurality of sets and to the fourth means, for selecting a set of the chrominance error-representative values on the basis of the sum of only the bounded predicted value of the chrominance signal and the value of the corresponding luminance signal.

44. An apparatus for decoding at least one encoded digital signal, comprising:
- first operational means, for predicting a value of a first sample of a signal;
- a plurality of sets of representative values of quantization levels of signal prediction errors;
- second operational means, coupled to the first means and to the plurality of sets, for selecting a set of the signal error-representative values on the basis of the predicted value of only the first sample of the signal;
- third operational means, coupled to the selected set, for selecting a signal error-representative value from the selected set of signal error-representative values on the basis of a received code indicative of the signal error-representative value; and
- fourth operational means, coupled to the first means and responsive to the selected value, for modifying the predicted value of the first sample of the signal by the selected signal error-representative value to generate a reconstructed value of the first sample of the signal.

45. The arrangement of claim 44 wherein the second means comprise:
- a plurality of quantization groups of predicted values of signal samples;
- fifth operational means, coupled to the plurality of groups and to the first means, for selecting a quantization group on the basis of the current predicted value of only the first sample of the signal; and
- eixth operational means, coupled to the plurality of sets and responsive to the selected group, for selecting a set of the signal error-representative values on the basis of the selected quantization group.

46. The arrangement of claim 44 wherein the plurality of sets of error-representative values comprise:
- a plurality of sets of signal error-representative values each associated with at least one predicted value of first samples of the signal, the error-representative values of each set representing quantization levels that together span a range of signal prediction error values bounded by an error value that is a maximum allowed for any predicted value of the at least one predicted value and an error value that is a minimum allowed for any predicted value of the at least one predicted value.

47. Transmitter portion of a digital component video communication system, comprising:
- first means for sampling an analog luminance signal of an image at a predetermined first frequency to generate digital actual values of a plurality of adjacent luminance samples that are horizontally and vertically adjacent in the image;
- first switching means having an input coupled to the first sampling means and having two outputs, the first switching means for switching digital actual values of horizontally and vertically adjacent luminance samples to different ones of its two outputs;
- a first encoder coupled to one output of the first switching means for encoding actual values of luminance samples received from the first switching means into differential pulse code modulated luminance signals, the first encoder having
- a luminance predictor for predicting a value for each luminance sample whose actual value is received by the first encoder, from reconstructed values of a plurality of preceding luminance samples whose actual values were received by the first encoder,
- first luminance storage means for storing a plurality of quantization groups of predicted values of luminance samples,
- means coupled to the luminance predictor and to the first luminance storage means for selecting in the first luminance storage means a quantization group on the basis of only the luminance sample predicted value currently received from the luminance predictor, second luminance storage means for storing a plurality of sets of representative values of quantization levels of luminance sample prediction errors, each set associated with a quantization group of luminance sample predicted values, the error-representative values of each set representing quantization levels that together span a range of luminance sample prediction error values bounded by an error value that is a maximum allowed for any predicted value of the associated quantization group and an error value that is a minimum allowed for any predicted value of the associated quantization group, means coupled to the first and second luminance storage means for selecting in the second luminance storage means a set of error-representative values on the basis of the quantization group selected in the first luminance storage means, means coupled to the one output of the first switching means and to the luminance predictor for subtracting from the actual value of a luminance sample received from the first switching means the predicted value of the luminance sample to generate a luminance sample error signal;

means coupled to the luminance sample error signal generating means and to the second luminance storage means for selecting in the second luminance storage means an error-representative value from the selected set of error-representative values on the basis of the luminance sample error signal, third luminance storage means for storing a plurality of sets of differential pulse code modulated (DPCM) luminance signals, each DPCM luminance signal representing an error-representative value, means coupled to the first and third luminance storage means for selecting in the third storage means a set of codes on the basis of the quantization group selected in the first luminance storage means, means coupled to the second and third luminance storage means for selecting in the third storage means a code from the selected set of codes on the basis of the error-representative value selected in the second luminance storage means, and means coupled to the second luminance storage means and to the luminance predictor for summing the predicted value of a luminance sample and the error-representative value of the luminance sample to generate and supply to the luminance predictor a reconstructed value of the luminance sample;

an interpolation selector coupled to the other output of the first switching means and to the luminance sample reconstructed value generating means for generating for each luminance sample actual value received from the first switching means a signal indicating which interpolated value, of a plurality of interpolated values obtained by interpolating reconstructed values of samples that are horizontally, vertically, left-diagonally, and right-diagonally adjacent to the sample for whose actual value the interpolated values are being obtained, is closest to the actual value;

second means for sampling an analog chrominance signal of the image at a predetermined second frequency that is substantially one half of the predetermined first frequency to generate digital actual values of a plurality of adjacent chrominance samples representing horizontally and vertically adjacent points of the image;

second switching means having an input coupled to the second sampling means and having an output, the second switching means for switching digital actual values of alternate adjacent chrominance samples to the output;

a second encoder coupled to the output of the second switching means for encoding actual values of chrominance samples received from the second switching means into differential pulse code modulated chrominance signals, the second encoder having a chrominance predictor for predicting a value for each chrominance sample whose actual value is received by the second encoder, from reconstructed values of a plurality of preceding chrominance samples whose actual values were received by the second encoder, first chrominance storage means for storing for each reconstructed value of luminance samples an associated upper bound and an associated lower bound of predicted values of chrominance samples, means coupled to the first chrominance storage means and to the luminance sample reconstructed value generating means for selecting from the first chrominance storage means the upper and lower bounds associated with a luminance sample reconstructed value generated by the luminance sample reconstructed value generating means, means coupled to the first chrominance storage means and to the chrominance predictor for comparing the chrominance sample predicted value with the selected upper and lower bounds, and indicating result of the comparison;

bounding means coupled to the luminance predictor, to the comparing means, and to the first chrominance storage means for selecting the chrominance sample predicted value when the comparing means indicate that the chrominance sample predicted value falls within the selected bounds, for selecting the selected upper bound when the comparing means indicate that the chrominance sample predicted value exceeds the selected upper bound, and for selecting the selected lower bound when the comparing means indicate that the selected lower bound exceeds the chrominance sample predicted value, to generate a bounded chrominance sample value, second chrominance storage means for storing a plurality of quantization groups of predicted values of chrominance samples, compensating means coupled to the bounding means and to the luminance sample reconstructed value generating means for summing the luminance sample reconstructed value and the bounded chrominance sample value to generate a compensated chrominance sample value, means coupled to the compensating means and to the second chrominance storage means for selecting in the second chrominance storage means a quantization group on the basis of only the compensated chrominance sample value currently received from the compensating means, third chrominance storage means for storing a plurality of sets of representative values of quantization levels of chrominance sample prediction errors, each set associated with a quantization group of chrominance sample predicted values, the error-representative values of each set representing quantization levels that together span a range of chrominance prediction error values bounded by an error value that is a maximum allowed for any predicted value of the associated quantization group and an error value that is a minimum allowed for any predicted value of the associated quantization group, means coupled to the second and third chrominance storage means for selecting in the third chrominance storage means a set of error-representative values on the basis of the quantization group selected in the second chrominance storage means, means coupled to the output of the second switching means and to the bounding means for subtracting from the actual value of a chrominance sample received from the second switching means the predicted value of the chrominance sample to generate a chrominance sample error signal;

means coupled to the chrominance sample error signal generating means and to the third chrominance storage means for selecting in the third chrominance storage means an error-representative value from the selected set of error-representative values on the basis of the chrominance sample error signal, fourth chrominance storage means for storing a plurality of sets of differential pulse code modulated (DPCM) chrominance signals, each DPCM chrominance signal representing an error-representative value, means coupled to the second and fourth chrominance storage means for selecting in the fourth chrominance storage means a set of codes on the basis of the quantization group selected in the second chrominance storage means, means coupled to the third and fourth chrominance storage means for selecting in the fourth chrominance storage means a code from the selected set of codes on the basis of the error-representative value selected in the third chrominance storage means, and means coupled to the third chrominance storage means and the chrominance predictor for summing the predicted value of a chrominance sample and the error-representative value of the sample to generate and supply to the chrominance predictor a reconstructed value of the chrominance sample;

means coupled to the third luminance storage means, to the interpolation selector, and to the fourth chrominance storage means, for multiplexing the differential pulse code modulated luminance signals, the interpolated value indicating signals, and the differential pulse code modulated chrominance signals into a single multiplexed digital signal stream; and means coupled to the multiplexing means for transmitting the multiplexed digital signal stream across a transmission medium.

48. Receiver portion of a digital component video communication system, comprising:

means for receiving across a transmission medium a multiplexed digital signal stream comprising differential pulse code modulated luminance signals, interpolated value indicating signals, and differential pulse code modulated chrominance signals;

means coupled to the receiving means for demultiplexing the multiplexed signal stream into its component signals;

a first decoder coupled to the demultiplexing means for decoding differential pulse code modulated luminance signals received from the demultiplexing means into reconstructed values of luminance samples, the received differential pulse code modulated luminance signals being second samples of a plurality of first and second luminance samples that are horizontally and vertically adjacent in the image, the second luminance samples being horizontally and vertically adjacent in the image to the first luminance samples, the first decoder having a luminance predictor for predicting a value for each luminance sample whose differential pulse code modulated signal is received by the first decoder, from reconstructed values of a plurality of preceding luminance samples whose differential pulse code modulated signals were received by the first encoder, first luminance storage means for storing a plurality of quantization groups of predicted values of luminance samples, means coupled to the luminance predictor and to the first luminance storage means for selecting in the first luminance storage means a quantization group on the basis of only the luminance sample predicted value currently received from the luminance predictor, second luminance storage means for storing a plurality of sets of representative values of quantization levels of luminance sample prediction errors, each set associated with a quantization group of luminance sample predicted values, the error-representative values of each set representing quantization levels that together span a range of luminance sample prediction error values bounded by an error value that is a maximum allowed for any predicted value of the associated quantization group and an error value that is a minimum allowed for any predicted value of the associated quantization group, means coupled to the first and second luminance storage means for selecting in the second luminance storage means a set of error-representative values on the basis of the quantization group selected in the first luminance storage means, means coupled to the demultiplexing means and to the second luminance storage means for selecting in the second luminance storage means an error-representative value from the selected set of error-representative values on the basis of a differential pulse code modulated luminance signal received from the demultiplexing means, and means coupled to the second luminance storage means and to the luminance predictor for summing the predicted value of a luminance sample and the error-representative value of the luminance sample to generate and supply to the luminance predictor a reconstructed value of the luminance sample;

a luminance interpolator coupled to the luminance sample reconstructed value generating means and to the demultiplexing means for generating for each first luminance sample a reconstructed value by interpolating reconstructed values of second samples received from the luminance sample reconstructed value generating means that are one of horizontally, vertically, left-diagonally, and right-diagonally adjacent to the first sample, the one adjacency being specified by an interpolated value indicating signal received from the demultiplexing means;

first multiplexing means coupled to the first encoder and to the luminance interpolator for generating a stream of the reconstructed values of alternating first and second samples of the luminance signal;

a luminance digital-to-analog converter for converting the stream of reconstructed values into a reconstructed analog luminance signal;

a second decoder coupled to the demultiplexing means for decoding differential pulse code modulated chrominance signals received from the demultiplexing means into reconstructed values of chrominance samples, the differential pulse code modulated chrominance signals representing second samples of a plurality of adjacent first and second chrominance samples, the first chrominance samples representing points of an image that are horizontally and vertically adjacent to points of the image represented by the second chrominance samples, the second decoder having a chrominance predictor for predicting a value for each chrominance sample whose differential pulse code modulated signal is received by the second decoder, from reconstructed values of a plurality of preceding chrominance samples whose differential pulse code modulated signals were received by the second decoder, first chrominance storage means for storing for each reconstructed value of luminance samples an associated upper bound and an associated lower bound of predicted values of chrominance samples, means coupled to the first chrominance storage means and to the luminance sample reconstructed value generating means for selecting from the first chrominance storage means the upper and lower bounds associated with a luminance sample reconstructed value generated by the luminance sample reconstructed value generating means, means coupled to the first chrominance storage means and to the chrominance predictor for comparing the chrominance sample predicted value with the selected upper and lower bounds, and indicating result of the comparison;

bounding means coupled to the luminance predictor, to the comparing means, and to the first chrominance storage means for selecting the chrominance sample predicted value when the comparing means indicate that the chrominance sample predicted value falls within the selected bounds, for selecting the selected upper bound when the comparing means indicate that the chrominance sample predicted value exceeds the selected upper bound, and for selecting the selected lower bound when the comparing means indicate that the selected lower bound exceeds the chrominance sample predicted value, to generate a bounded chrominance sample value, second chrominance storage means for storing a plurality of quantization groups of predicted values of chrominance samples, compensating means coupled to the bounding means and to the luminance sample reconstructed value generating means for summing the luminance sample reconstructed value and the bounded chrominance sample value to generate a compensated chrominance sample value, means coupled to the compensating means and to the second chrominance storage means for selecting in the second chrominance storage means a quantization group on the basis of only the compensated chrominance sample value currently received from the compensating means;

third chrominance storage means for storing a plurality of sets of representative values of quantization levels of chrominance sample prediction errors, each set associated with a quantization group of chrominance sample predicted values, the error-representative values of each set representing quantization levels that together span a range of chrominance prediction error values bounded by an error value that is a maximum allowed for any predicted value of the associated quantization group and an error value that is a minimum allowed for any predicted value of the associated quantization group, means coupled to the second and third chrominance storage means for selecting in the third chrominance storage means a set of error-representative values on the basis of the quantization group selected in the second chrominance storage means, means coupled to the demultiplexing means and to the third chrominance storage means for selecting in the third chrominance storage means an error-representative value from the selected set of error-representative values on the basis of a differential pulse code modulated chrominance signal received from the demultiplexing means, and means coupled to the third chrominance storage means and the chrominance predictor for summing the predicted value of a chrominance sample and the error-representative value of the sample to generate and supply to the chrominance predictor a reconstructed value of the chrominance sample;

a chrominance interpolator coupled to the chrominance sample reconstructed value generating means and to the demultiplexing means for generating for each first chrominance sample a reconstructed value by interpolating reconstructed values of second chrominance samples received from the chrominance sample reconstructed value generating means that are one of horizontally, vertically, left-diagonally, and right-diagonally adjacent to the first chrominance sample, the one adjacency being specified by the interpolated value indicating signal received from the demultiplexing means;

second multiplexing means coupled to the second encoder and to the chrominance interpolator for generating a stream of the reconstructed values of alternating first and second samples of the chrominance signal; and a chrominance digital-to-analog converter for converting the stream of reconstructed values into a reconstructed analog chrominance signal.

* * * * *